United States Patent
Zhuang et al.

(10) Patent No.: US 11,489,836 B2
(45) Date of Patent: Nov. 1, 2022

(54) METHOD, APPARATUS, AND SYSTEM FOR COLLECTING ACCESS CONTROL LIST

(71) Applicant: Huawei Technologies Co., Ltd., Shenzhen (CN)

(72) Inventors: Shunwan Zhuang, Beijing (CN); Peng Zhou, Shenzhen (CN); Zhenbin Li, Beijing (CN); Yuanbin Yin, Beijing (CN); Jianbin Xu, Beijing (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 209 days.

(21) Appl. No.: 16/739,551

(22) Filed: Jan. 10, 2020

(65) Prior Publication Data
US 2020/0153834 A1 May 14, 2020

Related U.S. Application Data

(63) Continuation of application No. 15/829,966, filed on Dec. 3, 2017, now Pat. No. 10,560,456, which is a
(Continued)

(51) Int. Cl.
*H04L 29/06* (2006.01)
*H04L 9/40* (2022.01)
(Continued)

(52) U.S. Cl.
CPC .............. *H04L 63/101* (2013.01); *H04L 9/40* (2022.05); *H04L 45/02* (2013.01); *H04L 69/22* (2013.01)

(58) Field of Classification Search
CPC ....... H04L 63/101; H04L 29/06; H04L 45/02; H04L 69/22
See application file for complete search history.

(56) References Cited

U.S. PATENT DOCUMENTS

| 9,929,946 B2 | 3/2018 | Filsfils et al. |
| 2003/0115344 A1* | 6/2003 | Tang .................. H04L 63/0272 709/229 |

(Continued)

FOREIGN PATENT DOCUMENTS

| CN | 101047651 A | 10/2007 |
| CN | 101667965 A | 3/2010 |

(Continued)

OTHER PUBLICATIONS

Marques, P., et al., "Dissemination of Flow Specification Rules", Network Working Group: Standards Track, RFC5575, Aug. 2009, 22 pages.

(Continued)

*Primary Examiner* — Shawnchoy Rahman
(74) *Attorney, Agent, or Firm* — Conley Rose, P.C.

(57) ABSTRACT

A method, an apparatus, and a system for collecting an access control list (ACL), where a second network device receives a first link-state advertisement (LSA) packet flooded by a first network device, where the first LSA packet includes a first network device identifier and first ACL information, and the first network device and the second network device belong to a same Interior Gateway Protocol (IGP) area, and sends an extended first Border Gateway Protocol-Link State (BGP-LS) packet to a controller, where the extended first BGP-LS packet includes the first network device identifier and the first ACL information such that the controller can collect ACL information of the first network device and manage the ACL information of the first network device.

20 Claims, 8 Drawing Sheets

Related U.S. Application Data continuation of application No. PCT/CN2016/084146, filed on May 31, 2016.

(51) Int. Cl.
*H04L 45/02* (2022.01)
*H04L 69/22* (2022.01)

(56) References Cited

U.S. PATENT DOCUMENTS

| | | |
|---|---|---|
| 2007/0014293 A1 | 1/2007 | Filsfils et al. |
| 2010/0162382 A1* | 6/2010 | Kim ................. H04L 43/18 726/13 |
| 2012/0209581 A1 | 8/2012 | Gao et al. |
| 2012/0297088 A1 | 11/2012 | Wang |
| 2014/0029412 A1 | 1/2014 | Janardhanan |
| 2014/0313880 A1 | 10/2014 | Lu et al. |
| 2015/0010301 A1 | 1/2015 | Previdi et al. |
| 2015/0049631 A1 | 2/2015 | Giles et al. |
| 2015/0200842 A1 | 7/2015 | Wang |
| 2016/0248859 A1 | 8/2016 | Jacquenet et al. |
| 2018/0091518 A1* | 3/2018 | Zhuang ................. H04L 9/40 |

FOREIGN PATENT DOCUMENTS

| | | | |
|---|---|---|---|
| CN | 103155485 A | | 6/2013 |
| CN | 104158809 A | * | 11/2014 |
| EP | 1850253 A1 | | 10/2007 |
| FR | 3012281 A1 | | 4/2015 |
| WO | WO-2007113115 A2 | * | 10/2007 ........... H04L 63/101 |
| WO | 2011038624 A1 | | 4/2011 |

OTHER PUBLICATIONS

Lougheed, K., et al., "A Border Gateway Protocol (BGP)", Network Working Group, rfc1105, Jun. 1989, 17 pages.
Lougheed, K., et al., "A Border Gateway Protocol (BGP)", Network Working Group, rfc1163, Jun. 1990, 29 pages.
Lougheed, K., et al., "A Border Gateway Protocol 3 (BGP-3)", Network Working Group, rfc1267, Oct. 1991, 35 pages.
Rekhter, Y., et al: "A Border Gateway Protocol 4 (BGP-4)", Network Working Group, Category: Standards Track, rfc4271, Jan. 2006, 104 pages.
Bates, T., et al: "Multiprotocol Extensions for BGP-4", Network Working Group, Category: Standards Track, rfc4760, Jan. 2007, 12 pages.
Gredler, H., et al: "North-Bound Distribution of Link-State and TE Information using BGP, draft-ietf-idr-ls-distribution-06", Inter-Domain Routing, Internet Draft, Intended status: standards track, Sep. 16, 2014, 44 pages.
Moy, J., "OSPF Version 2", Network Working Group, Category: Standards Track, rfc2328, Apr. 1998, 170 pages.
Berger, L,. et al: "The OSPF Opaque LSA Option", Network Working Group, Category: Standards Track, rfc5250, Jul. 2008, 17 pages.
Gredler H., et al: "North-Bound Distribution of Link-State and TE Information using BGP draft-ietf-idr-ls-distribution-10", Inter-Domain Routing Internet-Draft Intended status: Standards Track, Jan. 26, 2015, 23 pages.

* cited by examiner

```
 0                   1                   2                   3
 0 1 2 3 4 5 6 7 8 9 0 1 2 3 4 5 6 7 8 9 0 1 2 3 4 5 6 7 8 9 0 1
```

|           LS age          |      Options      |   LS Type = 10   |
|     Opaque type           |          Opaque ID                   |
|                    Advertising Router                            |
|                    LS sequence number                            |
|     LS checksum           |              Length                  |
|                           TLVs                                   |
|                           ...                                    |

FIG. 3

A second network device receives a first LSA packet flooded by a first network device, where the first LSA packet includes a first network device identifier and first ACL information correlated to the first network device identifier, the first network device identifier is used to identify the first network device, and the first network device and the second network device belong to a same Interior Gateway Protocol IGP area — 401

The second network device sends an extended first Border Gateway Protocol-Link State BGP-LS packet to a controller, where the extended first BGP-LS packet includes the first network device identifier and the first ACL information — 402

FIG. 4

METHOD, APPARATUS, AND SYSTEM FOR COLLECTING ACCESS CONTROL LIST

CROSS-REFERENCE TO RELATED APPLICATIONS

This application is a continuation of U.S. patent application Ser. No. 15/829,966 filed on Dec. 3, 2017, which is a continuation of International Patent Application No. PCT/CN2016/084146 filed on May 31, 2016, which claims priority to Chinese Patent Application No. 201510299148.4 filed on Jun. 3, 2015. All of the aforementioned patent applications are hereby incorporated by reference in their entireties.

TECHNICAL FIELD

The present disclosure relates to the field of communications technologies, and in particular, to a method, an apparatus, and a system for collecting an access control list.

BACKGROUND

As a network scale expands and traffic increases, network security control and bandwidth allocation become important content of network management. By filtering data packets, an unauthorized user can be effectively prevented from accessing a network, and traffic can also be controlled, to save network resources.

An access control list (ACL) is an instruction list set on a border router and a switch interface and is used to control a data packet that is input or output through a port on which the ACL is used. When receiving a data packet, a device analyzes a specific field of the data packet according to ACL information used on the port, and allows or forbids, using the ACL information, the corresponding data packet to pass in order to control network traffic.

Currently, ACLs on border routers are manually and statically configured one by one according to an actual requirement. In other approaches, there is no implementation solution to collecting and managing ACLs statically configured on border routers.

SUMMARY

Embodiments of the present disclosure provide a method, an apparatus, and a system for collecting an ACL in order to resolve a problem in other approaches that there is no implementation solution to collecting and managing ACLs statically configured on border routers.

In view of this, technical solutions used in the present disclosure to resolve the technical problem are as follows.

A first aspect of the embodiments of the present disclosure provides a method for collecting an ACL, where the method includes receiving, by a second network device, a first link-state advertisement (LSA) packet flooded by a first network device, where the first LSA packet includes a first network device identifier and first ACL information correlated to the first network device identifier, the first network device identifier is used to identify the first network device, and the first network device and the second network device belong to a same Interior Gateway Protocol (IGP) area, and sending, by the second network device, an extended first Border Gateway Protocol-Link State (BGP-LS) packet to the controller, where the extended first BGP-LS packet includes the first network device identifier and the first ACL information.

In a first possible implementation of the first aspect of the embodiments of the present disclosure, the extended first BGP-LS packet includes a local node descriptors field and an opaque node attribute type-length-value field, the local node descriptors field includes the first network device identifier, and the opaque node attribute type-length-value (TLV) field includes the first LSA packet of the first network device.

With reference to the first possible implementation of the first aspect of the embodiments of the present disclosure, in a second possible implementation, the opaque node attribute TLV field includes a type, a length, and a value, the type indicates that a type of the opaque node attribute TLV field is "report ACL information", the length indicates a length of the opaque node attribute TLV field, the value is opaque node attributes including the first LSA packet, and the first LSA packet includes the first ACL information of the first network device.

In a third possible implementation of the first aspect of the embodiments of the present disclosure, the extended first BGP-LS packet is newly added flow-spec network layer reachability information (NLRI), the flow-spec NLRI includes a local node descriptors field and a flow-spec descriptors field, the local node descriptors field includes the first network device identifier, and the flow-spec descriptors field includes the first ACL information of the first network device.

With reference to any one of the first aspect, or the first to the third possible implementations of the first aspect of the embodiments of the present disclosure, in a fourth possible implementation, the first LSA packet includes an opaque type field, an advertising network device identifier field, and a TLV field, the opaque type field carries a type value indicating that the first LSA packet is used to announce ACL information of a network device, the advertising network device identifier field carries the first network device identifier, and the TLV field carries the first ACL information of the first network device.

With reference to the fourth possible implementation of the first aspect of the embodiments of the present disclosure, in a fifth possible implementation, the TLV field includes a type, a length, and a value, the type indicates that a type of the TLV field is "carry ACL information", the length indicates a length of the TLV field, and the value is the first ACL information.

With reference to any one of the first aspect, or the first to the fifth possible implementations of the first aspect of the embodiments of the present disclosure, in a sixth possible implementation, the first LSA packet is an extended open shortest path first (OSPF) opaque LSA packet or an extended intermediate system to intermediate system (ISIS) opaque LSA packet.

With reference to any one of the first aspect, or the first to the sixth possible implementations of the first aspect of the embodiments of the present disclosure, in a seventh possible implementation, the method further includes obtaining, by the second network device, second ACL information and a second network device identifier of the second network device, where correspondingly, the extended first BGP-LS packet further includes the second network device identifier and the second ACL information.

With reference to any one of the first aspect, or the first to the seventh possible implementations of the first aspect of the embodiments of the present disclosure, in an eighth possible implementation, the method further includes generating, by the second network device, a second LSA packet, where the second LSA packet includes the second network device identifier and the second ACL information correlated to the second network device identifier, and the second network device identifier is used to identify the second network device, and flooding, by the second network device, the second LSA packet into the IGP area to which the second network device belongs, where the second LSA packet is used to announce the second ACL information of the second network device to another network device in the IGP area.

With reference to the eighth possible implementation of the first aspect of the embodiments of the present disclosure, in a ninth possible implementation, the second LSA packet includes an opaque type field, an advertising network device identifier field, and a TLV field, the opaque type field carries a type value indicating that the second LSA packet is used to announce ACL information of a network device, the advertising network device identifier field carries the second network device identifier, and the TLV field carries the second ACL information of the second network device.

With reference to the ninth possible implementation of the first aspect of the embodiments of the present disclosure, in a tenth possible implementation, the TLV field includes a type, a length, and a value, the type indicates that a type of the TLV field is "carry ACL information", the length indicates a length of the TLV field, and the value is the second ACL information of the second network device.

With reference to any one of the eighth possible implementation of the first aspect to the tenth possible implementation of the first aspect of the embodiments of the present disclosure, in an eleventh possible implementation, the second LSA packet is an extended OSPF opaque LSA packet or an extended intermediate ISIS opaque LSA packet.

With reference to any one of the first aspect, or the first to the eleventh possible implementations of the first aspect of the embodiments of the present disclosure, in a twelfth possible implementation, the method further includes receiving, by the second network device, an extended second BGP-LS packet sent by the controller, where the extended second BGP-LS packet carries an identifier of a target network device and first ACL editing information, the first ACL editing information is used to edit ACL information of the target network device, and the editing includes any one or more of operations such as modification, addition, deletion, and reset, and when the second network device determines, according to the identifier of the target network device, that the target network device is not the second network device, flooding, by the second network device, a third LSA packet to the target network device in the IGP area, where the third LSA packet is used to announce the first ACL editing information for the target network device to the target network device in the IGP area.

With reference to the twelfth possible implementation of the first aspect of the embodiments of the present disclosure, in a thirteenth possible implementation, the extended second BGP-LS packet includes a local node descriptors field and an opaque node attribute TLV field, the local node descriptors field includes the identifier of the target network device, and the opaque node attribute TLV filed includes the first ACL editing information for the target network device.

With reference to the thirteenth possible implementation of the first aspect of the embodiments of the present disclosure, in a fourteenth possible implementation, the opaque node attribute TLV field includes a type, a length, and a value, the type indicates that a type of the opaque node attribute TLV field is "announce ACL editing information", the length indicates a length of the opaque node attribute TLV field, the value is opaque node attributes including the third LSA packet, and the third LSA packet carries the first ACL editing information for the target network device.

With reference to the twelfth possible implementation of the first aspect of the embodiments of the present disclosure, in a fifteenth possible implementation, the extended second BGP-LS packet is newly added flow-spec NLRI, the flow-spec NLRI includes a local node descriptors field and a flow-spec descriptors field, the local node descriptors field includes the identifier of the target network device, and the flow-spec descriptors field includes the first ACL editing information for the target network device.

With reference to any one of the twelfth possible implementation of the first aspect to the fifteenth possible implementation of the first aspect of the embodiments of the present disclosure, in a sixteenth possible implementation, the third LSA packet includes an opaque type field, an advertising network device identifier field, and a TLV field, the opaque type field carries a type value indicating that the third LSA packet is used to announce ACL editing information used to edit ACL information of a target network device, the advertising network device identifier field carries the identifier of the target network device, and the TLV field carries the first ACL editing information for the target network device.

With reference to the sixteenth possible implementation of the first aspect of the embodiments of the present disclosure, in a seventeenth possible implementation, the TLV field includes a type, a length, and a value, the type indicates that a type of the TLV field is "carry ACL editing information", the length indicates a length of the TLV field, and the value is the first ACL editing information for the target network device.

With reference to any one of the twelfth possible implementation of the first aspect to the seventeenth possible implementation of the first aspect of the embodiments of the present disclosure, in an eighteenth possible implementation, the third LSA packet is an extended OSPF opaque LSA packet or an extended intermediate ISIS opaque LSA packet.

A second aspect of the embodiments of the present disclosure provides a method for collecting an ACL, where the method includes obtaining, by a first network device, first ACL information of the first network device, generating, by the first network device, a first LSA packet, where the first LSA packet includes a first network device identifier and the first ACL information correlated to the first network device identifier, and the first network device identifier is used to identify the first network device, and flooding, by the first network device, the first LSA packet into an IGP area to which the first network device belongs, where the first LSA packet is used to announce the first ACL information of the first network device to another network device in the IGP area.

In a first possible implementation of the second aspect of the embodiments of the present disclosure, the first LSA packet includes an opaque type field, an advertising network device identifier field, and a TLV field, the opaque type field carries a type value indicating that the first LSA packet is used to announce ACL information of a network device, the advertising network device identifier field carries the first network device identifier, and the TLV field carries the first ACL information of the first network device.

With reference to the first possible implementation of the second aspect of the embodiments of the present disclosure, in a second possible implementation, the TLV field includes a type, a length, and a value, the type indicates that a type of the TLV field is "carry ACL information", the length indicates a length of the TLV field, and the value is the first ACL information of the first network device.

With reference to any one of the second aspect, or the first or the second possible implementation of the second aspect of the embodiments of the present disclosure, in a third possible implementation, the first LSA packet is an extended OSPF opaque LSA packet or an extended ISIS opaque LSA packet.

With reference to any one of the second aspect, or the first to the third possible implementations of the second aspect of the embodiments of the present disclosure, in a fourth possible implementation, the method further includes receiving, by the first network device, a second LSA packet flooded by a second network device that belongs to the IGP area, where the second LSA packet includes a second network device identifier and second ACL information correlated to the second network device identifier, the second network device identifier is used to identify the second network device, and the second LSA packet is used to announce the second ACL information of the second network device to another network device in the IGP area.

With reference to the fourth possible implementation of the second aspect of the embodiments of the present disclosure, in a fifth possible implementation, the second LSA packet includes an opaque type field, an advertising network device identifier field, and a TLV field, the opaque type field carries a type value indicating that the second LSA packet is used to announce ACL information of a network device, the advertising network device identifier field carries the second network device identifier, and the TLV field carries the second ACL information of the second network device.

With reference to the fifth possible implementation of the second aspect of the embodiments of the present disclosure, in a sixth possible implementation, the TLV field includes a type, a length, and a value, the type indicates that a type of the TLV field is "carry ACL information", the length indicates a length of the TLV field, and the value is the second ACL information of the second network device.

With reference to any one of the fourth possible implementation of the second aspect to the sixth possible implementation of the second aspect of the embodiments of the present disclosure, in a seventh possible implementation, the second LSA packet is an extended OSPF opaque LSA packet or an extended intermediate ISIS opaque LSA packet.

With reference to any one of the second aspect, or the first to the seventh possible implementations of the second aspect of the embodiments of the present disclosure, in an eighth possible implementation, the method further includes receiving, by the first network device, a third LSA packet flooded by the second network device that belongs to the IGP area, where the third LSA packet carries an identifier of a target network device and first ACL editing information correlated to the identifier of the target network device, the first ACL editing information is used to edit ACL information of the target network device, and the editing includes any one or more of operations such as modification, addition, deletion, and reset, when the first network device determines, according to the identifier of the target network device, that the target network device of the third LSA packet is the first network device, parsing, by the first network device, the third LSA packet to obtain the first ACL editing information, and editing, by the first network device, the first ACL information of the first network device according to the first ACL editing information, where the editing includes any one or more of operations such as modification, addition, deletion, and reset.

With reference to the eighth possible implementation of the second aspect of the embodiments of the present disclosure, in a ninth possible implementation, the third LSA packet includes an opaque type field, an advertising network device identifier field, and a TLV field, the opaque type field carries a type value indicating that the third LSA packet is used to announce ACL editing information used to edit ACL information of a target network device, the advertising network device identifier field carries the identifier of the target network device, and the TLV field carries the first ACL editing information for the target network device.

With reference to the ninth possible implementation of the second aspect of the embodiments of the present disclosure, in a tenth possible implementation, the TLV field includes a type, a length, and a value, the type indicates that a type of the TLV field is "carry ACL editing information", the length indicates a length of the TLV field, and the value is the first ACL editing information for the target network device.

With reference to any one of the eighth possible implementation of the second aspect to the tenth possible implementation of the second aspect of the embodiments of the present disclosure, in an eleventh possible implementation, the third LSA packet is an extended OSPF opaque LSA packet or an extended intermediate ISIS opaque LSA packet.

With reference to any one of the second aspect, or the first to the seventh possible implementations of the second aspect of the embodiments of the present disclosure, in a twelfth possible implementation, the method further includes receiving, by the first network device, an ACL configuration packet delivered by a controller using a control channel, parsing, by the first network device, the ACL configuration packet to obtain second ACL editing information, and editing, by the first network device, the first ACL information of the first network device according to the second ACL editing information, where the editing includes any one or more of operations such as modification, addition, deletion, and reset.

A third aspect of the embodiments of the present disclosure provides a method for collecting an ACL, where the method includes receiving, by a controller, an extended first BGP-LS packet sent by a second network device, and parsing, by the controller, the extended first BGP-LS packet to obtain a first network device identifier and first ACL information of a first network device, where the first network device and the second network device belong to a same IGP area.

In a first possible implementation of the third aspect of the embodiments of the present disclosure, the extended first BGP-LS packet includes a local node descriptors local node descriptors field and an opaque node attribute type-length-value opaque node attribute TLV field, the local node descriptors field includes the first network device identifier, and the opaque node attribute TLV includes the first ACL information of the first network device.

With reference to the first possible implementation of the third aspect of the embodiments of the present disclosure, in a second possible implementation, the opaque node attribute TLV field includes a type, a length, and a value, the type indicates that a type of the opaque node attribute TLV field is "report ACL information", the length indicates a length of the opaque node attribute TLV field, the value is opaque node attributes including a first LSA packet, and the first LSA packet carries the first ACL information of the first network device.

With reference to the second possible implementation of the third aspect of the embodiments of the present disclosure, in a third possible implementation, the first LSA packet includes an opaque type field, an advertising network device identifier field, and a TLV field, the opaque type field carries a type value indicating that the first LSA packet is used to announce ACL information of a network device, the advertising network device identifier field carries the first network device identifier, and the TLV field carries the first ACL information of the first network device.

With reference to the third possible implementation of the third aspect of the embodiments of the present disclosure, in a fourth possible implementation, the TLV field includes a type, a length, and a value, the type indicates that a type of the TLV field is "carry ACL information", the length indicates a length of the TLV field, and the value is the first ACL information of the first network device.

With reference to any one of the third aspect, or the first to the fourth possible implementations of the third aspect of the embodiments of the present disclosure, in a fifth possible implementation, the first LSA packet is an extended OSPF opaque LSA packet or an extended intermediate ISIS opaque LSA packet.

In a sixth possible implementation of the third aspect of the present disclosure, the extended first BGP-LS packet is flow-spec NLRI, the flow-spec NLRI includes a local node descriptors field and a flow-spec descriptors field, the local node descriptors field includes the first network device identifier, and the flow-spec descriptors field includes the first ACL information of the first network device.

With reference to any one of the third aspect, or the first to the sixth possible implementations of the third aspect of the embodiments of the present disclosure, in a seventh possible implementation, the method further includes parsing, by the controller, the extended first BGP-LS packet to obtain a second network device identifier and second ACL information of the second network device.

With reference to any one of the third aspect, or the first to the seventh possible implementations of the third aspect of the embodiments of the present disclosure, in an eighth possible implementation, the method further includes sending, by the controller, an extended second BGP-LS packet to the second network device, where the extended second BGP-LS packet includes a device identifier of a first target network device and first ACL editing information, the first ACL editing information is used to edit ACL information of the first target network device, and the editing includes any one or more of operations such as modification, addition, deletion, and reset.

With reference to the eighth possible implementation of the third aspect of the embodiments of the present disclosure, in a ninth possible implementation, the extended second BGP-LS packet includes a local node descriptors field and an opaque node attribute TLV field, the local node descriptors field includes the identifier of the first target network device, and the opaque node attribute TLV includes the first ACL editing information for the first target network device.

With reference to the ninth possible implementation of the third aspect of the embodiments of the present disclosure, in a tenth possible implementation, the opaque node attribute TLV field includes a type, a length, and a value, the type indicates that a type of the opaque node attribute TLV field is "announce ACL editing information", the length indicates a length of the opaque node attribute TLV field, the value is opaque node attributes including a third LSA packet, and the third LSA packet carries the first ACL editing information for the first target network device.

With reference to the tenth possible implementation of the third aspect of the embodiments of the present disclosure, in an eleventh possible implementation, the third LSA packet includes an opaque type field, an advertising network device identifier field, and a TLV field, the opaque type field carries a type value indicating that the third LSA packet is used to announce ACL editing information used to edit ACL information of a target network device, the advertising network device identifier field carries the identifier of the first target network device, and the TLV field carries the first ACL editing information for the first target network device.

With reference to the eleventh possible implementation of the third aspect of the embodiments of the present disclosure, in a twelfth possible implementation, the TLV field includes a type, a length, and a value, the type indicates that a type of the TLV field is "carry ACL editing information", the length indicates a length of the TLV field, and the value is the first ACL editing information for the first target network device.

With reference to any one of the tenth possible implementation of the third aspect to the twelfth possible implementation of the third aspect of the embodiments of the present disclosure, in a thirteenth possible implementation, the third LSA packet is an extended OSPF opaque LSA packet or an extended intermediate ISIS opaque LSA packet.

With reference to the eighth possible implementation of the third aspect of the embodiments of the present disclosure, in a fourteenth possible implementation, the extended second BGP-LS packet is flow-spec NLRI, the flow-spec NLRI includes a local node descriptors field and a flow-spec descriptors field, the local node descriptors field includes the identifier of the first target network device, and the flow-spec descriptors field includes the first ACL editing information for the first target network device.

With reference to any one of the eighth possible implementation of the third aspect to the fourteenth possible implementation of the third aspect of the embodiments of the present disclosure, in a fifteenth possible implementation, the second BGP-LS packet further includes second ACL editing information, the second ACL editing information is used to edit second ACL information of the second target network device, and the editing includes any one or more of operations such as modification, addition, deletion, and reset.

With reference to any one of the third aspect, or the first to the fifteenth possible implementations of the third aspect of the embodiments of the present disclosure, in a sixteenth possible implementation, the method further includes sending, by the controller, an ACL configuration packet to a target network device using a control channel, where the ACL configuration packet carries third ACL editing information, the third ACL editing information is used to edit first ACL information of the target network device, and the editing includes any one or more of operations such as modification, addition, deletion, and reset.

A fourth aspect of the embodiments of the present disclosure provides a second network device for collecting an ACL, where the second network device includes a first receiving module configured to receive a first LSA packet flooded by a first network device, where the first LSA packet includes a first network device identifier and first ACL information correlated to the first network device identifier, the first network device identifier is used to identify the first network device, and the first network device and the second network device belong to a same IGP area, and a first sending module configured to send an extended first BGP-LS packet to the controller, where the extended first BGP-LS packet includes the first network device identifier and the first ACL information.

In a first possible implementation of the fourth aspect of the embodiments of the present disclosure, the extended first BGP-LS packet includes a local node descriptors local node descriptors field and an opaque node attribute type-length-value opaque node attribute TLV field, the local node descriptors field includes the first network device identifier, and the opaque node attribute TLV field includes the first LSA packet of the first network device.

With reference to the first possible implementation of the fourth aspect of the embodiments of the present disclosure, in a second possible implementation, the opaque node attribute TLV field includes a type, a length, and a value, the type indicates that a type of the opaque node attribute TLV field is "report ACL information", the length indicates a length of the opaque node attribute TLV field, the value is opaque node attributes including the first LSA packet, and the first LSA packet includes the first ACL information of the first network device.

In a third possible implementation of the fourth aspect of the embodiments of the present disclosure, the extended first BGP-LS packet is newly added flow-spec NLRI, the flow-spec NLRI includes a local node descriptors field and a flow-spec descriptors field, the local node descriptors field includes the first network device identifier, and the flow-spec descriptors field includes the first ACL information of the first network device.

With reference to any one of the fourth aspect, or the first to the third possible implementations of the fourth aspect of the embodiments of the present disclosure, in a fourth possible implementation, the first LSA packet includes an opaque type field, an advertising network device identifier field, and a TLV field, the opaque type field carries a type value indicating that the first LSA packet is used to announce ACL information of a network device, the advertising network device identifier field carries the first network device identifier, and the TLV field carries the first ACL information of the first network device.

With reference to the fourth possible implementation of the fourth aspect of the embodiments of the present disclosure, in a fifth possible implementation, the TLV field includes a type, a length, and a value, the type indicates that a type of the TLV field is "carry ACL information", the length indicates a length of the TLV field, and the value is the first ACL information.

With reference to any one of the fourth aspect, or the first to the fifth possible implementations of the fourth aspect of the embodiments of the present disclosure, in a sixth possible implementation, the first LSA packet is an extended OSPF opaque LSA packet or an extended intermediate ISIS opaque LSA packet.

With reference to any one of the fourth aspect, or the first to the sixth possible implementations of the fourth aspect of the embodiments of the present disclosure, in a seventh possible implementation, the second network device further includes an obtaining module configured to obtain second ACL information and a second network device identifier of the second network device, where correspondingly, the extended first BGP-LS packet further includes the second network device identifier and the second ACL information.

With reference to any one of the fourth aspect, or the first to the seventh possible implementations of the fourth aspect of the embodiments of the present disclosure, in an eighth possible implementation, the second network device further includes a packet generation module configured to generate a second LSA packet, where the second LSA packet includes the second network device identifier and the second ACL information correlated to the second network device identifier, and the second network device identifier is used to identify the second network device, and a second sending module configured to flood the second LSA packet into the IGP area to which the second network device belongs, where the second LSA packet is used to announce the second ACL information of the second network device to another network device in the IGP area.

With reference to the eighth possible implementation of the fourth aspect of the embodiments of the present disclosure, in a ninth possible implementation, the second LSA packet includes an opaque type field, an advertising network device identifier field, and a TLV field, the opaque type field carries a type value indicating that the second LSA packet is used to announce ACL information of a network device, the advertising network device identifier field carries the second network device identifier, and the TLV field carries the second ACL information of the second network device.

With reference to the ninth possible implementation of the fourth aspect of the embodiments of the present disclosure, in a tenth possible implementation, the TLV field includes a type, a length, and a value, the type indicates that a type of the TLV field is "carry ACL information", the length indicates a length of the TLV field, and the value is the second ACL information of the second network device.

With reference to any one of the eighth possible implementation of the fourth aspect to the tenth possible implementation of the fourth aspect of the embodiments of the present disclosure, in an eleventh possible implementation, the second LSA packet is an extended OSPF opaque LSA packet or an extended intermediate ISIS opaque LSA packet.

With reference to any one of the fourth aspect, or the first to the eleventh possible implementations of the fourth aspect of the present disclosure, in a twelfth possible implementation, the second network device further includes a second receiving module configured to receive an extended second BGP-LS packet sent by the controller, where the extended second BGP-LS packet carries an identifier of a target network device and first ACL editing information, the first ACL editing information is used to edit ACL information of the target network device, and the editing includes any one or more of operations such as modification, addition, deletion, and reset, and a third sending module configured to, when the second network device determines, according to the identifier of the target network device, that the target network device is not the second network device, flood a third LSA packet to the target network device in the IGP area, where the third LSA packet is used to announce the first ACL editing information for the target network device to the target network device in the IGP area.

With reference to the twelfth possible implementation of the fourth aspect of the embodiments of the present disclosure, in a thirteenth possible implementation, the extended second BGP-LS packet includes a local node descriptors field and an opaque node attribute TLV field, the local node descriptors field includes the identifier of the target network device, and the opaque node attribute TLV includes the first ACL editing information for the target network device.

With reference to the thirteenth possible implementation of the fourth aspect of the embodiments of the present disclosure, in a fourteenth possible implementation, the opaque node attribute TLV field includes a type, a length, and a value, the type indicates that a type of the opaque node attribute TLV field is "announce ACL editing information", the length indicates a length of the opaque node attribute TLV field, the value is opaque node attributes including the third LSA packet, and the third LSA packet carries the first ACL editing information for the target network device.

With reference to the twelfth possible implementation of the fourth aspect of the embodiments of the present disclosure, in a fifteenth possible implementation, the extended second BGP-LS packet includes flow-spec NLRI, the flow-spec NLRI includes a local node descriptors field and a flow-spec descriptors field, the local node descriptors field includes the identifier of the target network device, and the flow-spec descriptors field includes the first ACL editing information for the target network device.

With reference to any one of the twelfth possible implementation of the fourth aspect to the fifteenth possible implementation of the fourth aspect of the embodiments of the present disclosure, in a sixteenth possible implementation, the third LSA packet includes an opaque type field, an advertising network device identifier field, and a TLV field, the opaque type field carries a type value indicating that the third LSA packet is used to announce ACL editing information used to edit ACL information of a target network device, the advertising network device identifier field carries the identifier of the target network device, and the TLV field carries the first ACL editing information for the target network device.

With reference to the sixteenth possible implementation of the fourth aspect of the embodiments of the present disclosure, in a seventeenth possible implementation, the TLV field includes a type, a length, and a value, the type indicates that a type of the TLV field is "carry ACL editing information", the length indicates a length of the TLV field, and the value is the first ACL editing information for the target network device.

With reference to any one of the twelfth possible implementation of the fourth aspect to the seventeenth possible implementation of the fourth aspect of the embodiments of the present disclosure, in an eighteenth possible implementation, the third LSA packet is an extended OSPF opaque LSA packet or an extended intermediate ISIS opaque LSA packet.

A fifth aspect of the embodiments of the present disclosure provides a first network device for collecting an ACL, where the first network device includes an obtaining module configured to obtain first ACL information of the first network device, a packet generation module configured to generate a first LSA packet, where the first LSA packet includes a first network device identifier and the first ACL information correlated to the first network device identifier, and the first network device identifier is used to identify the first network device, and a sending module configured to flood the first LSA packet into an IGP area to which the first network device belongs, where the first LSA packet is used to announce the first ACL information of the first network device to another network device in the IGP area.

In a first possible implementation of the fifth aspect of the embodiments of the present disclosure, the first LSA packet includes an opaque type field, an advertising network device identifier field, and a TLV field, the opaque type field carries a type value indicating that the first LSA packet is used to announce ACL information of a network device, the advertising network device identifier field carries the first network device identifier, and the TLV field carries the first ACL information of the first network device.

With reference to the first possible implementation of the fifth aspect of the embodiments of the present disclosure, in a second possible implementation, the TLV field includes a type, a length, and a value, the type indicates that a type of the TLV field is "carry ACL information", the length indicates a length of the TLV field, and the value is the first ACL information of the first network device.

With reference to any one of the fifth aspect, or the first or the second possible implementation of the fifth aspect of the embodiments of the present disclosure, in a third possible implementation, the first LSA packet is an extended OSPF opaque LSA packet or an extended intermediate ISIS opaque LSA packet.

With reference to any one of the fifth aspect, or the first to the third possible implementations of the fifth aspect of the embodiments of the present disclosure, in a fourth possible implementation, the first network device further includes a first receiving module configured to receive a second LSA packet flooded by a second network device that belongs to the IGP area, where the second LSA packet includes a second network device identifier and second ACL information correlated to the second network device identifier, the second network device identifier is used to identify the second network device, and the second LSA packet is used to announce the second ACL information of the second network device to another network device in the IGP area.

With reference to the fourth possible implementation of the fifth aspect of the embodiments of the present disclosure, in a fifth possible implementation, the second LSA packet includes an opaque type field, an advertising network device identifier field, and a TLV field, the opaque type field carries a type value indicating that the second LSA packet is used to announce ACL information of a network device, the advertising network device identifier field carries the second network device identifier, and the TLV field carries the second ACL information of the second network device.

With reference to the fifth possible implementation of the fifth aspect of the embodiments of the present disclosure, in a sixth possible implementation, the TLV field includes a type, a length, and a value, the type indicates that a type of the TLV field is "carry ACL information", the length indicates a length of the TLV field, and the value is the second ACL information of the second network device.

With reference to any one of the fourth possible implementation of the fifth aspect to the sixth possible implementation of the fifth aspect of the embodiments of the present disclosure, in a seventh possible implementation, the second LSA packet is an extended OSPF opaque LSA packet or an extended intermediate ISIS opaque LSA packet.

With reference to any one of the fifth aspect, or the first to the seventh possible implementations of the fifth aspect of the embodiments of the present disclosure, in an eighth possible implementation, the first network device further includes a second receiving module configured to receive a third LSA packet flooded by the second network device that belongs to the IGP area, where the third LSA packet carries an identifier of a target network device and first ACL editing information correlated to the identifier of the target network device, the first ACL editing information is used to edit ACL information of the target network device, and the editing includes any one or more of operations such as modification, addition, deletion, and reset, a first parsing module configured to, when the first network device determines, according to the identifier of the target network device, that the target network device of the third LSA packet is the first network device, parse the third LSA packet to obtain the first ACL editing information, and a first editing module configured to edit the first ACL information of the first network device according to the first ACL editing information.

With reference to the eighth possible implementation of the fifth aspect of the embodiments of the present disclosure, in a ninth possible implementation, the third LSA packet includes an opaque type field, an advertising network device identifier field, and a TLV field, the opaque type field carries a type value indicating that the third LSA packet is used to announce ACL editing information used to edit ACL information of a target network device, the advertising network device identifier field carries the identifier of the target network device, and the TLV field carries the first ACL editing information for the target network device.

With reference to the ninth possible implementation of the fifth aspect of the embodiments of the present disclosure, in a tenth possible implementation, the TLV field includes a type, a length, and a value, the type indicates that a type of the TLV field is "carry ACL editing information", the length indicates a length of the TLV field, and the value is the first ACL editing information for the target network device.

With reference to any one of the eighth possible implementation of the fifth aspect to the tenth possible implementation of the fifth aspect of the embodiments of the present disclosure, in an eleventh possible implementation, the third LSA packet is an extended OSPF opaque LSA packet or an extended intermediate ISIS opaque LSA packet.

With reference to any one of the fifth aspect, or the first to the seventh possible implementations of the fifth aspect of the embodiments of the present disclosure, in a twelfth possible implementation, the first network device further includes a third receiving module configured to receive an ACL configuration packet delivered by a controller using a control channel, a second parsing module configured to parse the ACL configuration packet to obtain second ACL editing information, and a second editing module configured to edit the first ACL information of the first network device according to the second ACL editing information, where the editing includes any one or more of operations such as modification, addition, deletion, and reset.

A sixth aspect of the embodiments of the present disclosure provides a controller for collecting an ACL, where the controller includes a receiving module configured to receive an extended first BGP-LS packet sent by a second network device, and a first parsing module configured to parse the extended first BGP-LS packet to obtain a first network device identifier and first ACL information of a first network device, where the first network device and the second network device belong to a same IGP area.

In a first possible implementation of the sixth aspect of the embodiments of the present disclosure, the extended first BGP-LS packet includes a local node descriptors local node descriptors field and an opaque node attribute type-length-value opaque node attribute TLV field, the local node descriptors field includes the first network device identifier, and the opaque node attribute TLV includes the first ACL information of the first network device.

With reference to the first possible implementation of the sixth aspect of the embodiments of the present disclosure, in a second possible implementation, the opaque node attribute TLV field includes a type, a length, and a value, the type indicates that a type of the opaque node attribute TLV field is "report ACL information", the length indicates a length of the opaque node attribute TLV field, the value is opaque node attributes including a first LSA packet, and the first LSA packet carries the first ACL information of the first network device.

With reference to the second possible implementation of the sixth aspect of the embodiments of the present disclosure, in a third possible implementation, the first LSA packet includes an opaque type field, an advertising network device identifier field, and a TLV field, the opaque type field carries a type value indicating that the first LSA packet is used to announce ACL information of a network device, the advertising network device identifier field carries the first network device identifier, and the TLV field carries the first ACL information of the first network device.

With reference to the third possible implementation of the sixth aspect of the embodiments of the present disclosure, in a fourth possible implementation, the TLV field includes a type, a length, and a value, the type indicates that a type of the TLV field is "carry ACL information", the length indicates a length of the TLV field, and the value is the first ACL information of the first network device.

With reference to any one of the sixth aspect, or the first to the fourth possible implementations of the sixth aspect of the embodiments of the present disclosure, in a fifth possible implementation, the first LSA packet is an extended OSPF opaque LSA packet or an extended intermediate ISIS opaque LSA packet.

In a sixth possible implementation of the sixth aspect of the present disclosure, the extended first BGP-LS packet is flow-spec NLRI, the flow-spec NLRI includes a local node descriptors field and a flow-spec descriptors field, the local node descriptors field includes the first network device identifier, and the flow-spec descriptors field includes the first ACL information of the first network device.

With reference to any one of the sixth aspect, or the first to the sixth possible implementations of the sixth aspect of the embodiments of the present disclosure, in a seventh possible implementation, the controller further includes a second parsing module configured to parse the extended first BGP-LS packet to obtain a second network device identifier and second ACL information of the second network device.

With reference to any one of the sixth aspect, or the first to the seventh possible implementations of the sixth aspect of the embodiments of the present disclosure, in an eighth possible implementation, the controller further includes a first sending module configured to send an extended second BGP-LS packet to the second network device, where the extended second BGP-LS packet includes a device identifier of a first target network device and first ACL editing information, the first ACL editing information is used to edit ACL information of the first target network device, and the editing includes any one or more of operations such as modification, addition, deletion, and reset.

With reference to the eighth possible implementation of the sixth aspect of the embodiments of the present disclosure, in a ninth possible implementation, the extended second BGP-LS packet includes a local node descriptors field and an opaque node attribute TLV field, the local node descriptors field includes the identifier of the first target network device, and the opaque node attribute TLV includes the first ACL editing information for the first target network device.

With reference to the ninth possible implementation of the sixth aspect of the embodiments of the present disclosure, in a tenth possible implementation, the opaque node attribute TLV field includes a type, a length, and a value, the type indicates that a type of the opaque node attribute TLV field is "announce ACL editing information", the length indicates a length of the opaque node attribute TLV field, the value is opaque node attributes including a third LSA packet, and the third LSA packet carries the first ACL editing information for the first target network device.

With reference to the tenth possible implementation of the sixth aspect of the embodiments of the present disclosure, in an eleventh possible implementation, the third LSA packet includes an opaque type field, an advertising network device identifier field, and a TLV field, the opaque type field carries a type value indicating that the third LSA packet is used to announce ACL editing information used to edit ACL information of a target network device, the advertising network device identifier field carries the identifier of the first target network device, and the TLV field carries the first ACL editing information for the first target network device.

With reference to the eleventh possible implementation of the sixth aspect of the embodiments of the present disclosure, in a twelfth possible implementation, the TLV field includes a type, a length, and a value, the type indicates that a type of the TLV field is "carry ACL editing information", the length indicates a length of the TLV field, and the value is the first ACL editing information for the first target network device.

With reference to any one of the tenth possible implementation of the sixth aspect to the twelfth possible implementation of the sixth aspect of the embodiments of the present disclosure, in a thirteenth possible implementation, the third LSA packet is an extended OSPF opaque LSA packet or an extended intermediate ISIS opaque LSA packet.

With reference to the eighth possible implementation of the sixth aspect of the embodiments of the present disclosure, in a fourteenth possible implementation, the extended second BGP-LS packet is flow-spec NLRI, the flow-spec NLRI includes a local node descriptors field and a flow-spec descriptors field, the local node descriptors field includes the identifier of the target network device, and the flow-spec descriptors field includes the first ACL editing information for the target network device.

With reference to any one of the eighth possible implementation of the sixth aspect to the fourteenth possible implementation of the sixth aspect of the embodiments of the present disclosure, in a fifteenth possible implementation, the second BGP-LS packet further includes second ACL editing information, the second ACL editing information is used to edit second ACL information of the second target network device, and the editing includes any one or more of operations such as modification, addition, deletion, and reset.

With reference to any one of the sixth aspect, or the first to the fifteenth possible implementations of the sixth aspect of the embodiments of the present disclosure, in a sixteenth possible implementation, the controller further includes a second sending module configured to send an ACL configuration packet to a target network device using a control channel, where the ACL configuration packet carries third ACL editing information, the third ACL editing information is used to edit first ACL information of the target network device, and the editing includes any one or more of operations such as modification, addition, deletion, and reset.

A seventh aspect of the present disclosure provides a system for collecting an ACL, where the system includes the second network device according to any one of the fourth aspect, or the first to the eighteenth possible implementations of the fourth aspect of the embodiments of the present disclosure, the controller according to any one of the sixth aspect, or the first to the sixteenth possible implementations of the sixth aspect of the embodiments of the present disclosure, and at least one first network device according to any one of the fifth aspect, or the first to the twelfth possible implementations of the fifth aspect of the embodiments of the present disclosure.

It can be learned from the foregoing technical solutions that the embodiments of the present disclosure have the following beneficial effects.

The embodiments of the present disclosure provide the method, the apparatus, and the system for collecting an ACL. A second network device receives a first LSA packet flooded by a first network device, where the first LSA packet includes a first network device identifier and first ACL information correlated to the first network device identifier, the first network device identifier is used to identify the first network device, and the first network device and the second network device belong to a same IGP area, and sends an extended first BGP-LS packet to the controller, where the extended first BGP-LS packet includes the first network device identifier and the first ACL information such that the controller can collect the ACL information of the first network device, and manage the ACL information of the first network device. Using the method, ACL information of any one or more network devices in the IGP area can be collected, and the ACL information of the network device can be managed. In this way, a method for collecting and managing ACL information is provided, and ACL information maintenance work is simplified.

BRIEF DESCRIPTION OF DRAWINGS

To describe technical solutions in embodiments of the present disclosure more clearly, the following briefly describes the accompanying drawings required for describing the embodiments or other approaches. The accompanying drawings in the following description show merely some embodiments of the present disclosure, and a person of ordinary skill in the art may still derive other drawings from these accompanying drawings without creative efforts.

FIG. 3 is a schematic diagram of a format of a first LSA packet according to an embodiment of the present disclosure.

FIG. 4 is a flowchart of a method for collecting an ACL according to an embodiment of the present disclosure.

DESCRIPTION OF EMBODIMENTS

Embodiments of the present disclosure provide implementation solutions of a method, an apparatus, and a system for collecting an ACL. The following describes the present disclosure with reference to the accompanying drawings of the specification. It should be understood that the embodiments described herein are merely used to describe and explain the present disclosure, but are not intended to limit the present disclosure. Moreover, when no conflict occurs, the embodiments in this application and the features in the embodiments may be mutually combined.

Figure 1:
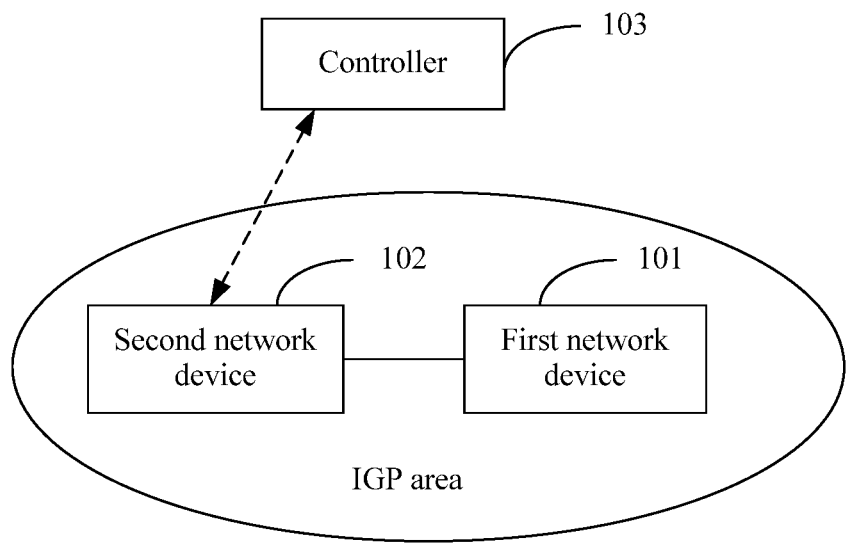
FIG. 1 is a schematic diagram of an IGP management area network structure according to an embodiment of the present disclosure.

FIG. 1 is a schematic diagram of an IGP management area network structure. A first network device 101 is a network device that is in an IGP area and that does not directly establish a communication connection to a controller 103. The first network device 101 establishes an IGP connection to another network device in the IGP area. The first network device 101 floods first ACL information of the first network device 101 to the other network device in the IGP area using the IGP connection. A second network device 102 is a network device that is in the IGP area and that directly establishes a communication connection to the controller 103. The second network device 102 establishes a BGP-LS connection to the controller 103. The second network device 102 sends ACL information of any one or more network devices in the IGP area to the controller 103 using the BGP-LS connection.

It should be noted that in an embodiment, that a controller directly establishes a communication connection to a network device may mean that there is physically a direct physical-connection-line interconnection and that there is logically a communication connection, or may mean that there is physically no direct physical-connection-line interconnection (that is, there is another intermediate device connected to the controller and the network device, and the controller and the network device are indirectly interconnected) but that there is logically a communication connection. The logical communication connection may be specifically a control-protocol communication connection.

Figure 2:
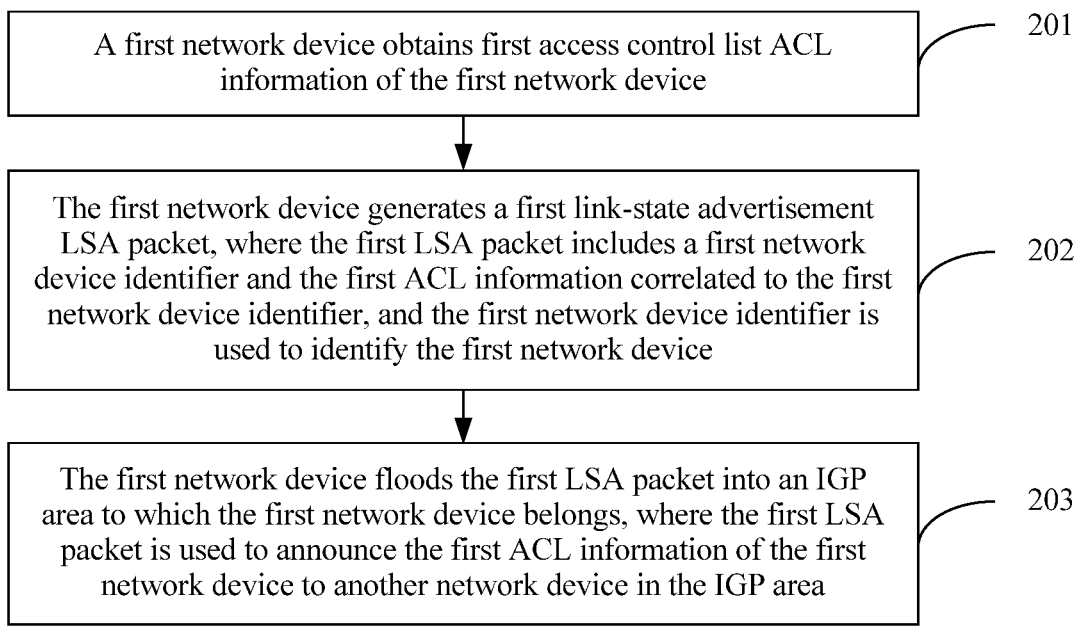
FIG. 2 is a flowchart of a method for collecting an ACL according to an embodiment of the present disclosure.

FIG. 2 is a flowchart of a method for collecting an ACL according to an embodiment of the present disclosure. The method includes the following steps.

201. A first network device obtains first ACL information of the first network device.

202. The first network device generates a first LSA packet, where the first LSA packet includes a first network device identifier and the first ACL information correlated (correlate) to the first network device identifier, and the first network device identifier is used to identify the first network device.

203. The first network device floods the first LSA packet into an IGP area to which the first network device belongs, where the first LSA packet is used to announce the first ACL information of the first network device to another network device in the IGP area.

The first network device establishes an IGP connection to the other network device in the IGP area. The first network device floods the first LSA packet to the other network device in the IGP area using the IGP connection. The first LSA packet includes the first network device identifier and the first ACL information correlated to the first network device identifier. The first network device announces the first ACL information of the first network device to the other network device in the IGP area using the first LSA packet. The other network device in the IGP area receives the first LSA packet flooded by the first network device, and parses the first LSA packet to obtain the first ACL information of the first network device.

In a specific embodiment, the first LSA packet includes an opaque type field, an advertising router field, and a TLV field. The opaque type field carries a type value indicating that the first LSA packet is used to announce ACL information of a network device. The advertising network device identifier field carries the first network device identifier. The TLV field carries the first ACL information of the first network device.

In an embodiment, the TLV field includes a type, a length, and a value. The type indicates that a type of the TLV field is "carry ACL information". The length indicates a length of the TLV field. The value is the first ACL information of the first network device.

In the IGP area, IGP used in an IGP connection established between network devices includes the Routing Information Protocol (RIP), the OSPF Protocol, the Interior Gateway Routing Protocol (IGRP), the ISIS Protocol, and the like.

The first LSA packet is an extended OSPF opaque LSA packet or an extended intermediate ISIS opaque LSA packet.

A format of an LSA packet is described using an example in which the first LSA packet is an extended OSPF opaque LSA packet. A format of the first LSA packet is shown in FIG. 3.

Link-state (LS) age. represents a time in a unit of a second since the first LSA packet is originated, and a definition is the same as that in the [RFC 2328 Standards].

Options is where a definition is the same as that in the [RFC 2328 Standards].

LS type is a type number of the first LSA.

Opaque type is an opaque type, where in this embodiment of the present disclosure, the opaque type is extended to add a new type value, for example, an OSPF ACL opaque read LSA (type code TBD) that is used to indicate that the first LSA packet is used to announce ACL information of a network device.

Opaque ID is an opaque identifier, where an opaque type and an opaque ID number jointly identify a link state ID in a first LSA header, and a definition is the same as that in [RFC 5250].

Advertising router is an identifier of the first network device that sends the first LSA packet, where a definition is the same as that in [RFC 2328].

LS sequence number is a sequence number of the first LSA, where a definition is the same as that in [RFC 2328].

LS checksum is a checksum of all information of the first LSA except an LS age field, where a definition is the same as that in [RFC 2328].

Length is a total length of the first LSA in a unit of a byte, including an LSA header, where a definition is the same as that in [RFC 2328].

TLVs may include one or more sub-TLVs, and these sub-TLVs can be combined into the first ACL information.

Alternatively, the first LSA packet may be another IGP LSA packet. Details are not described herein.

It should be noted herein that description is provided in the method using the first network device in the IGP area as an example. Similarly, any network device in the IGP area may flood, into the IGP area in a similar manner, an LSA packet that carries ACL information of the network device, and announce the ACL information of the network device to another network device, other than the network device, in the IGP area.

In a specific embodiment, the method further includes receiving, by the first network device, a second LSA packet flooded by a second network device that belongs to the IGP area, where the second LSA packet includes a second network device identifier and second ACL information correlated to the second network device identifier, the second network device identifier is used to identify the second network device, and the second LSA packet is used to announce the second ACL information of the second network device to another network device in the IGP area.

In the specific embodiment, the second LSA packet includes an opaque type field, an advertising network device identifier field, and a TLV field. The opaque type field carries a type value indicating that the second LSA packet is used to announce ACL information of a network device. The advertising network device identifier field carries the second network device identifier. The TLV field carries the second ACL information of the second network device.

The TLV field includes a type, a length, and a value. The type indicates that a type of the TLV field is "carry ACL information". The length indicates a length of the TLV field. The value is the second ACL information of the second network device.

The second LSA packet is an extended OSPF opaque LSA packet or an extended intermediate ISIS opaque LSA packet.

The format of the first LSA packet is the same as that of the second LSA packet. The first LSA packet and the second LSA packet each include the opaque type fields, the advertising network device identifier fields, and the TLV fields. The opaque type field in the first LSA packet and the opaque type field in the second LSA packet are the same and used to indicate that an LSA packet is used to announce ACL information of a network device. However, specific content included in the advertising network device identifier field and the TLV field of the first LSA packet is different from specific content included in the advertising network device identifier field and the TLV field of the second LSA packet.

The first network device may not only flood the first ACL information of the first network device into the IGP area, but may also receive an LSA packet flooded by the other network device in the IGP area. The first network device receives the second LSA packet flooded by the second network device, where the second LSA packet includes the second network device identifier and the second ACL information correlated to the second network device identifier such that the first network device can parse the second LSA packet to obtain the second ACL information of the second network device.

Likewise, when the IGP area includes not only the first network device and the second network device, the first network device may further receive an LSA packet flooded by another network device, other than the second network device, in the IGP area, to learn of ACL information of the other network device.

It should be noted herein that description is provided in the method using the first network device in the IGP area as an example. Similarly, any network device in the IGP area may receive an LSA packet flooded by another network device, to obtain ACL information of the other network device. Generally, a network device in the IGP area stores ACL information of all network devices in the IGP area.

In a specific embodiment, the method further includes receiving, by the first network device, a third LSA packet flooded by the second network device that belongs to the IGP area, where the third LSA packet carries an identifier of a target network device and first ACL editing information correlated to the identifier of the target network device, and the first ACL editing information is used to edit ACL information of the target network device, when the first network device determines, according to the identifier of the target network device, that the target network device of the third LSA packet is the first network device, parsing, by the first network device, the third LSA packet to obtain the first ACL editing information, and editing, by the first network device, the first ACL information of the first network device according to the first ACL editing information.

A controller may edit ACL information of a network device in the IGP area. Description is provided using the first network device as an example. When the first ACL information of the first network device does not meet an actual requirement, the controller generates the first ACL editing information according to the actual requirement. The first ACL editing information is used to edit the first ACL information of the first network device.

The first network device does not establish a BGP-LS connection to the controller, and the second network device establishes a BGP-LS connection to the controller. Therefore, the controller first sends, to the second network device, a BGP-LS packet that carries the first ACL editing information, the second network device and the first network device are located in the same IGP area, and then the second network device floods, into the IGP area, the third LSA packet that carries the first ACL editing information. The third LSA packet carries the identifier of the target network device, that is, carries the first network device identifier. After receiving the third LSA packet, the first network device recognizes, according to the identifier of the target network device that is carried in the third LSA packet, that the target network device is the first network device, parses the third LSA packet to obtain the first ACL editing information, and edits the first ACL information of the first network device according to the first ACL editing information.

In the specific embodiment, the third LSA packet includes an opaque type field, an advertising network device identifier field, and a TLV field. The opaque type field carries a type value indicating that the third LSA packet is used to announce ACL editing information used to edit ACL information of a target network device. The advertising network device identifier field carries the identifier of the target network device. The TLV field carries the first ACL editing information for the target network device.

The TLV field includes a type, a length, and a value. The type indicates that a type of the TLV field is "carry ACL editing information". The length indicates a length of the TLV field. The value is the first ACL editing information for the target network device.

The third LSA packet is an extended OSPF opaque LSA packet or an extended intermediate ISIS opaque LSA packet.

A format of the third LSA packet is similar to that of the first LSA packet. The third LSA packet includes the opaque type field. In this embodiment of the present disclosure, the opaque type is extended to add a new type value, for example, an OSPF ACL opaque write LSA (type code TBD) that is used to indicate that the third LSA packet is used to announce ACL editing information used to edit ACL information of a target network device. The advertising network device identifier field of the third LSA packet carries the identifier of the target network device. The TLV field carries the first ACL editing information for the target network device.

It should be noted herein that, in this embodiment of the present disclosure, the IGP area network structure shown in FIG. 1 is described using an example in which the second network device establishes a BGP-LS connection to the controller. In an embodiment, another network device may establish a BGP-LS connection to the controller, and the first network device receives a third LSA packet flooded by the network device that establishes the BGP-LS connection to the controller, and parses the third LSA packet to obtain first ACL editing information.

In a specific embodiment, the method further includes receiving, by the first network device, an ACL configuration packet delivered by a controller using a control channel, parsing, by the first network device, the ACL configuration packet to obtain second ACL editing information, and editing, by the first network device, the first ACL information of the first network device according to the second ACL editing information.

When the controller edits ACL information of a network device in the IGP area, the controller may directly send generated ACL editing information to the network device in the IGP area. Description is provided using the first network device as an example. When the first ACL information of the first network device does not meet an actual requirement, the controller may generate the second ACL editing information. The second ACL editing information is used to edit the first ACL information of the first network device.

It should be noted herein that, a method for editing the ACL information of the network device in the IGP area by the controller is not limited to editing the first ACL information of the first network device, and may be used to edit ACL information of any network device in the IGP area. Editing the ACL information of the network device according to the ACL editing information generated by the controller includes performing any one or more of operations such as modification, addition, deletion, and reset on the ACL information of the network device.

FIG. 4 is a flowchart of a method for collecting an ACL according to an embodiment of the present disclosure. The method includes the following steps.

401. A second network device receives a first LSA packet flooded by a first network device, where the first LSA packet includes a first network device identifier and first ACL information correlated to the first network device identifier, the first network device identifier is used to identify the first network device, and the first network device and the second network device belong to a same IGP area.

402. The second network device sends an extended first BGP-LS packet to the controller, where the extended first BGP-LS packet includes the first network device identifier and the first ACL information.

The second network device establishes a BGP-LS connection to the controller. The second network device and the first network device are located in the same IGP area. The second network device receives the first LSA packet flooded by the first network device, and parses the first LSA packet to obtain the first ACL information of the first network device.

The second network device sends the extended first BGP-LS packet to the controller, and announces the first ACL information of the first network device to the controller using the extended first BGP-LS packet. In an embodiment, the second network device may not only receive the first LSA packet flooded by the first network device, to learn of the first ACL information of the first network device, but may also receive an LSA packet flooded by another network device that belongs to the same IGP area as the second network device, to learn of ACL information of the other network device. Generally, the second network device stores ACL information of all network devices in the IGP area. The extended first BGP-LS packet sent by the second network device to the controller may carry ACL information of any one or more network devices in the IGP area.

In a specific embodiment, the extended first BGP-LS packet includes a local node descriptors local node descriptors field and an opaque node attribute type-length-value opaque node attribute TLV field. The local node descriptors field includes the first network device identifier. The opaque node attribute TLV field includes the first LSA packet of the first network device.

The opaque node attribute TLV field includes a type, a length, and a value. The type indicates that a type of the opaque node attribute TLV field is "report ACL information". The length indicates a length of the opaque node attribute TLV field. The value is opaque node attributes including the first LSA packet. The first LSA packet includes the first ACL information of the first network device.

It should be noted herein that the local node descriptors field carries device description information of the first network device, and the device description information of the first network device includes the first network device identifier and other device information.

Figure 5:
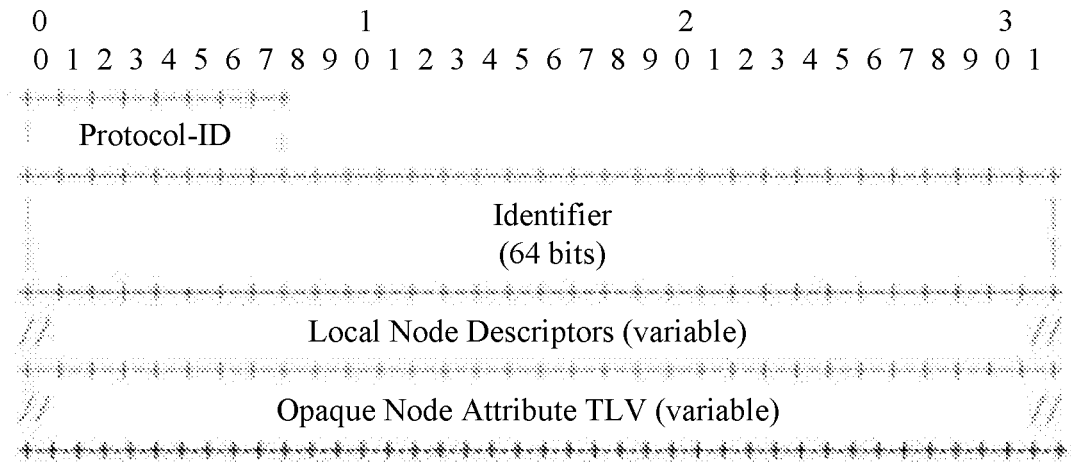
FIG. 5 is a schematic diagram of a first format of an extended first BGP-LS packet according to an embodiment of the present disclosure.
Figure 6:
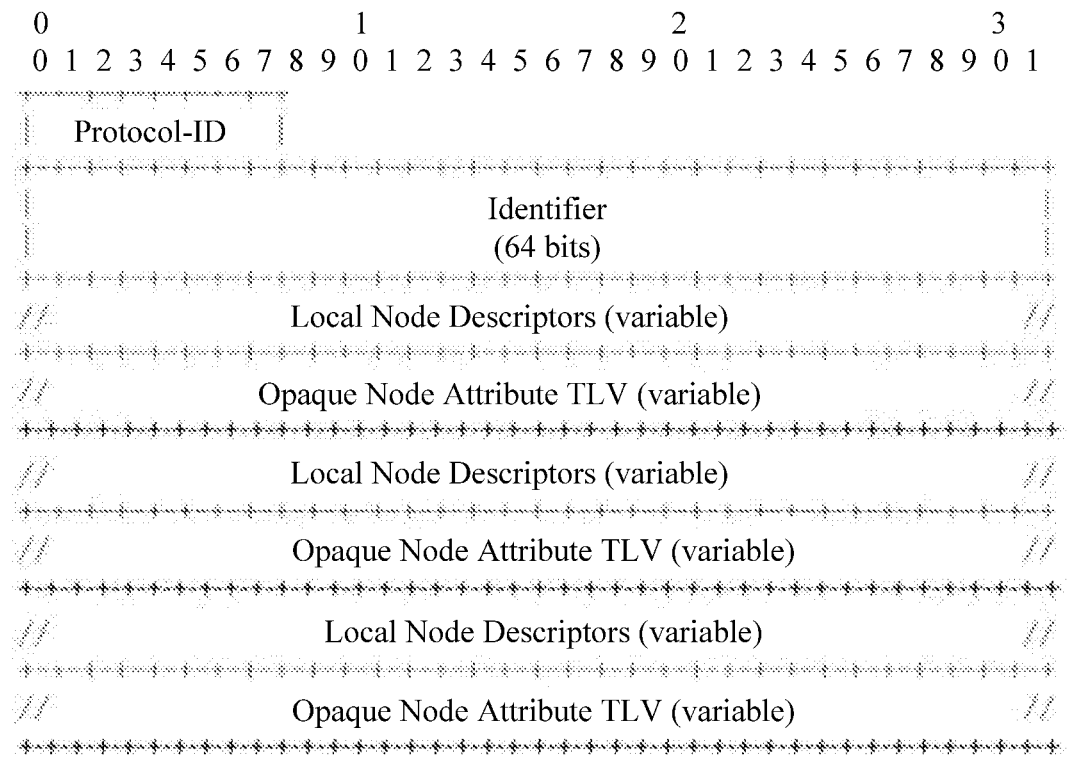
FIG. 6 is a schematic diagram in which multiple pieces of ACL information are included in a first format of an extended first BGP-LS packet according to an embodiment of the present disclosure.

A format of the extended first BGP-LS packet is shown in FIG. 5.

Protocol-identification (ID) is a BGP-LS protocol identifier, where a definition is the same as a draft-ietf-idr-ls-distribution-10 definition.

Identifier is a topology identifier that is used to distinguish different IGP processes, where a default of 0 indicates that current information corresponds to a layer 3 topology (L3 TOPO), and a definition is the same as a draft-ietf-idr-ls-distribution-10 definition.

Local node descriptors (variable) is description information of a network device (a length is variable), where the local node descriptors field is used to carry the description information of the network device, and the description information of the network device includes an identifier of the network device.

Opaque node attribute TLV (variable) describes ACL information (a length is variable).

When the extended first BGP-LS packet includes ACL information of one network device, the extended first BGP-LS packet includes one local node descriptors field and one opaque node attribute TLV field. The local node descriptors field includes an identifier of the network device. The opaque node attribute TLV field includes an LSA packet carrying the ACL information of the network device. When the extended first BGP-LS packet includes ACL information of multiple network devices, the extended first BGP-LS packet includes multiple groups of network device information that include multiple local node descriptors fields and multiple opaque node attribute TLV fields. As shown in FIG.

6, one local node descriptors field and one opaque node attribute TLV field form one group of information, that is, an identifier of one network device is followed by one opaque node attribute TLV field that includes an LSA packet carrying ACL information of the network device. A quantity of local node descriptors fields is the same as a quantity of opaque node attribute TLV fields, and each of the quantities is the same as a quantity of network devices.

In a specific embodiment, the first LSA packet includes an opaque type field, an advertising network device identifier field, and a TLV field. The opaque type field carries a type value indicating that the first LSA packet is used to announce ACL information of a network device. The advertising network device identifier field carries the first network device identifier. The TLV field carries the first ACL information of the first network device.

The TLV field includes a type, a length, and a value. The type indicates that a type of the TLV field is "carry ACL information". The length indicates a length of the TLV field. The value is the first ACL information.

The first LSA packet is an extended OSPF opaque LSA packet or an extended intermediate ISIS opaque LSA packet.

A format of the first LSA packet is the same as the format of the first LSA packet shown in FIG. 3 in the method for collecting an ACL shown in FIG. 2. For details, refer to description of the first LSA packet shown in FIG. 3 in the method for collecting an ACL. Details are not described herein again.

In another specific embodiment, the extended first BGP-LS packet is newly added flow-spec NLRI. The flow-spec NLRI includes a local node descriptors field and a flow-spec descriptors field. The local node descriptors field includes the first network device identifier. The flow-spec descriptors field includes the first ACL information of the first network device.

Figure 7:
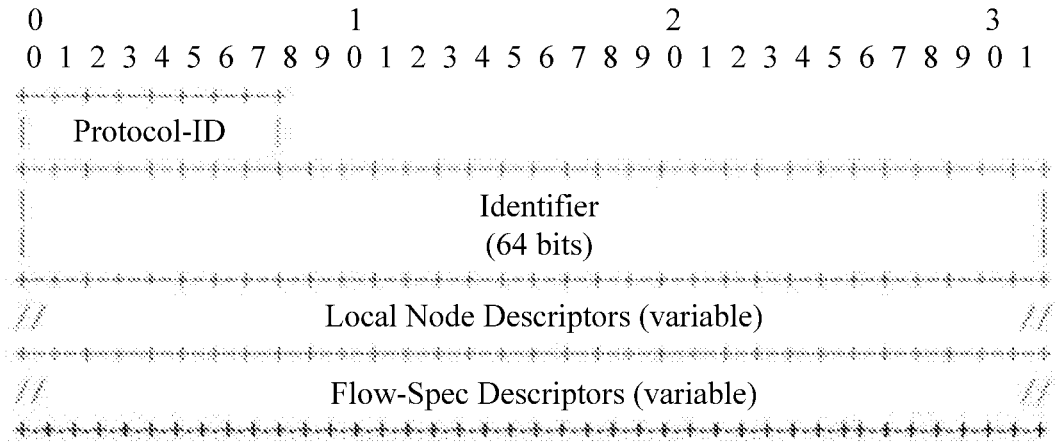
FIG. 7 is a schematic diagram of a second format of an extended first BGP-LS packet according to an embodiment of the present disclosure.

A format of the flow-spec NLRI is shown in FIG. 7.

Protocol-ID is a BGP-LS protocol identifier, where a definition is the same as a draft-ietf-idr-ls-distribution-10 definition.

Identifier is a topology identifier that is used to distinguish different IGP processes, where a default of 0 indicates that current information corresponds to a layer 3 topology (L3 TOPO), and a definition is the same as a draft-ietf-idr-ls-distribution-10 definition.

Local node descriptors (variable) is description information of a network device (a length is variable), where the local node descriptors field carries the description information of the network device, and the description information of the network device includes an identifier of the network device.

Flow-spec descriptors (variable) describes ACL information (a length is variable).

Figure 8:
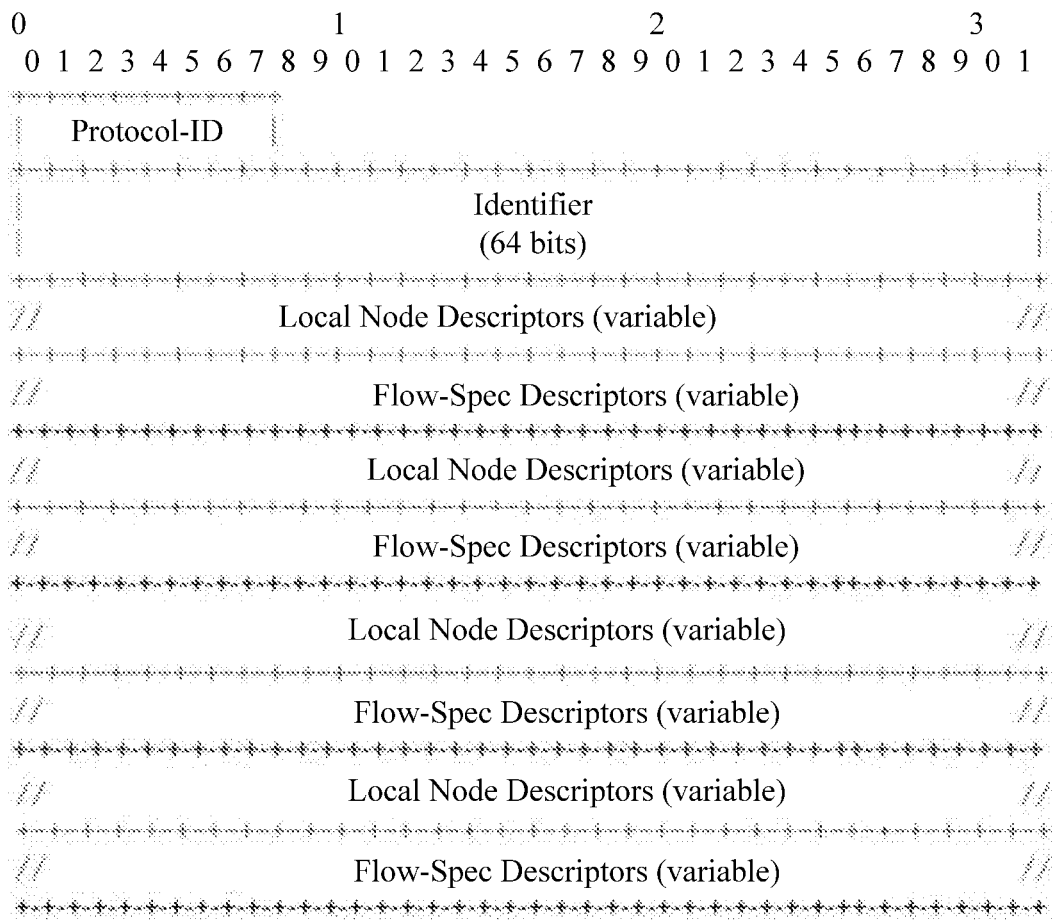
FIG. 8 is a schematic diagram in which multiple pieces of ACL information are included in a second format of an extended first BGP-LS packet according to an embodiment of the present disclosure.

When the extended first BGP-LS packet includes ACL information of one network device, the extended first BGP-LS packet includes one local node descriptors field and one flow-spec descriptors field. The local node descriptors field includes an identifier of the network device. The flow-spec descriptors field includes the ACL information of the network device. When the extended first BGP-LS packet includes ACL information of multiple network devices, the extended first BGP-LS packet includes multiple groups of network device information that include multiple local node descriptors fields and multiple flow-spec descriptors fields. As shown in FIG. 8, one local node descriptors field and one flow-spec descriptors field form one group of information, that is, an identifier of one network device is followed by one flow-spec descriptors field that includes ACL information of the network device. A quantity of local node descriptors fields is the same as a quantity of flow-spec descriptors fields, and each of the quantities is the same as a quantity of network devices.

Optionally, the method further includes obtaining, by the second network device, second ACL information and a second network device identifier of the second network device.

Correspondingly, the extended first BGP-LS packet further includes the second network device identifier and the second ACL information.

Optionally, the method further includes generating, by the second network device, a second LSA packet, where the second LSA packet includes the second network device identifier and the second ACL information correlated to the second network device identifier, and the second network device identifier is used to identify the second network device, and flooding, by the second network device, the second LSA packet into the IGP area to which the second network device belongs, where the second LSA packet is used to announce the second ACL information of the second network device to another network device in the IGP area.

The second network device may further flood the second LSA packet into the IGP area. The second LSA packet includes the second network device identifier and the second ACL information correlated to the second network device identifier. After receiving the second LSA packet, the other network device in the IGP area may learn of the second ACL information of the second network device.

In a specific embodiment, the second LSA packet includes an opaque type field, an advertising network device identifier field, and a TLV field. The opaque type field carries a type value indicating that the second LSA packet is used to announce ACL information of a network device. The advertising network device identifier field carries the second network device identifier. The TLV field carries the second ACL information of the second network device.

The TLV field includes a type, a length, and a value. The type indicates that a type of the TLV field is "carry ACL information". The length indicates a length of the TLV field. The value is the second ACL information of the second network device.

The second LSA packet is an extended OSPF opaque LSA packet or an extended intermediate ISIS opaque LSA packet.

A format of the second LSA packet is similar to the format of the first LSA packet shown in FIG. 3 in the method for collecting an ACL shown in FIG. 2. For details, refer to description of the first LSA packet shown in FIG. 3 in the method for collecting an ACL. Details are not described herein again.

In a specific embodiment, the method further includes receiving, by the second network device, an extended second BGP-LS packet sent by the controller, where the extended second BGP-LS packet carries an identifier of a target network device and first ACL editing information, and the first ACL editing information is used to edit ACL information of the target network device, and when the second network device determines, according to the identifier of the target network device, that the target network device is not the second network device, flooding, by the second network device, a third LSA packet to the target network device in the IGP area, where the third LSA packet is used to announce the first ACL editing information for the target network device to the target network device in the IGP area.

The second network device establishes a BGP-LS communication connection to the controller. The second network device receives the extended second BGP-LS packet sent by the controller. The extended second BGP-LS packet includes the identifier of the target network device and the first ACL editing information configured by the controller for the target network device. The first ACL editing information is used to edit the ACL information of the target network device.

The second network device parses the extended second BGP-LS packet to obtain the first ACL editing information. The extended second BGP-LS packet has at least two possible structures.

In a first possible structure, the extended second BGP-LS packet includes a local node descriptors field and an opaque node attribute TLV field. The local node descriptors field includes the identifier of the target network device. The opaque node attribute TLV includes the first ACL editing information for the target network device.

The opaque node attribute TLV field includes a type, a length, and a value. The type indicates that a type of the opaque node attribute TLV field is "announce ACL editing information". The length indicates a length of the opaque node attribute TLV field. The value is opaque node attributes including a third LSA packet. The third LSA packet carries the first ACL editing information for the target network device.

In a second possible structure, the extended second BGP-LS packet is newly added flow-spec NLRI. The flow-spec NLRI includes a local node descriptors field and a flow-spec descriptors field. The local node descriptors field includes the identifier of the target network device. The flow-spec descriptors field includes the first ACL editing information for the target network device.

The second network device recognizes the target network device according to the identifier of the target network device in the extended second BGP-LS packet. When recognizing that the target network device is the second network device, the second network device parses the extended second BGP-LS packet to obtain the first ACL editing information, and edits the second ACL information of the second network device.

When the second network device recognizes, according to the identifier of the target network device, that the target network device is not the second network device, the second network device floods the third LSA packet into the IGP area to which the second network device belongs. The third LSA packet carries the first ACL editing information. After receiving the third LSA packet, the target network device performs parsing to obtain the first ACL editing information, and edits the ACL information of the target network device.

It can be learned from the two different formats of the second BGP-LS packet that, when the second BGP-LS packet includes the opaque node attribute TLV field, the opaque node attribute TLV field includes the third LSA packet, when the second BGP-LS packet includes the flow-spec descriptors field, the second network device parses the flow-spec descriptors field of the second BGP-LS packet to obtain the first ACL editing information, and generates the third LSA packet according to the first ACL editing information.

In a specific embodiment, the third LSA packet includes an opaque type field, an advertising network device identifier field, and a TLV field. The opaque type field carries a type value indicating that the third LSA packet is used to announce ACL editing information used to edit ACL information of a target network device. The advertising network device identifier field carries the identifier of the target network device. The TLV field carries the first ACL editing information for the target network device.

The TLV field includes a type, a length, and a value. The type indicates that a type of the TLV field is "carry ACL editing information". The length indicates a length of the TLV field. The value is the first ACL editing information for the target network device.

The third LSA packet is an extended OSPF opaque LSA packet or an extended intermediate ISIS opaque LSA packet.

The third LSA packet includes the opaque type field. In this embodiment of the present disclosure, the opaque type is extended to add a new type value, for example, an OSPF ACL opaque write LSA (type code TBD) that is used to indicate that the third LSA packet is used to announce ACL editing information used to edit ACL information of a target network device. The advertising network device identifier field of the third LSA packet carries the identifier of the target network device. The TLV field carries the first ACL editing information for the target network device.

The type value of the opaque type field in the first LSA packet and the type value of the opaque type field in the second LSA packet are OSPF ACL opaque read LSAs that are used to announce ACL information of a network device. The type value of the opaque type field in the third LSA packet is an OSPF ACL opaque write LSA that is used to announce ACL editing information used to edit ACL information of a target network device.

It should be noted herein that the extended second BGP-LS packet received by the second network device from the controller may include the first ACL editing information used to edit ACL information of one target network device, or may include ACL editing information used to edit ACL information of multiple target network devices. An implementation method is similar. Details are not described herein.

Figure 9:
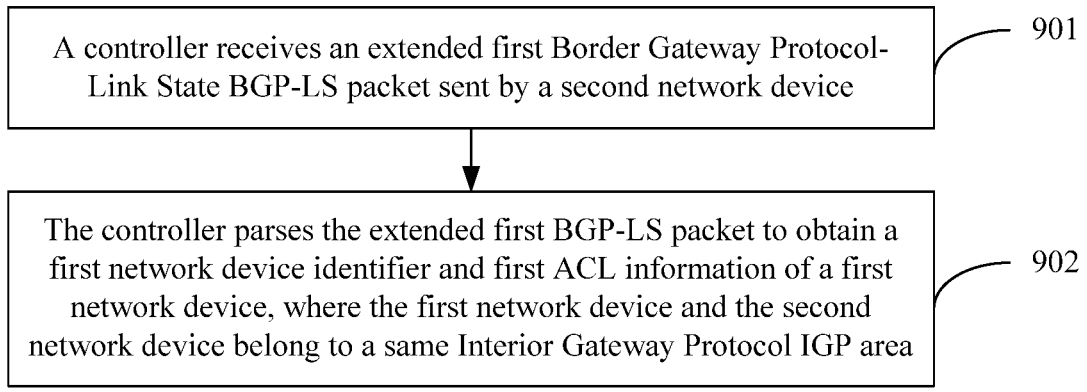
FIG. 9 is a flowchart of a method for collecting an ACL according to an embodiment of the present disclosure.

FIG. 9 is a flowchart of a method for collecting an ACL according to an embodiment of the present disclosure. The method includes the following steps.

901. A controller receives an extended first BGP-LS packet sent by a second network device.

902. The controller parses the extended first BGP-LS packet to obtain a first network device identifier and first ACL information of a first network device, where the first network device and the second network device belong to a same IGP area.

The controller receives the extended first BGP-LS packet sent by the second network device, and parses the extended first BGP-LS packet to obtain the first ACL information of the first network device.

The extended first BGP-LS packet has at least two possible structures.

In a first possible structure, the extended first BGP-LS packet includes a local node descriptors local node descriptors field and an opaque node attribute type-length-value opaque node attribute TLV field. The local node descriptors field includes the first network device identifier. The opaque node attribute TLV includes the first ACL information of the first network device.

The opaque node attribute TLV field includes a type, a length, and a value. The type indicates that a type of the opaque node attribute TLV field is "report ACL information". The length indicates a length of the opaque node attribute TLV field. The value is opaque node attributes including a first LSA packet. The first LSA packet carries the first ACL information of the first network device.

The first possible structure of the extended first BGP-LS packet is the same as a structure of the first BGP-LS packet shown in FIG. 5 in the method for collecting an ACL provided in FIG. 4. For details, refer to description of the extended first BGP-LS packet shown in FIG. 5. Details are not described herein again.

In a specific embodiment, the first LSA packet includes an opaque type field, an advertising network device identifier field, and a TLV field. The opaque type field carries a type value indicating that the first LSA packet is used to announce ACL information of a network device. The advertising network device identifier field carries the first network device identifier. The TLV field carries the first ACL information of the first network device.

The TLV field includes a type, a length, and a value. The type indicates that a type of the TLV field is "carry ACL information". The length indicates a length of the TLV field. The value is the first ACL information of the first network device.

The first LSA packet is an extended OSPF opaque LSA packet or an extended intermediate ISIS opaque LSA packet.

A format of the first LSA packet is similar to the format of the first LSA packet shown in FIG. 3 in the method for collecting an ACL shown in FIG. 2. For details, refer to description of the first LSA packet shown in FIG. 3 in the method for collecting an ACL. Details are not described herein again.

In a second possible structure, the extended first BGP-LS packet is flow-spec NLRI. The flow-spec NLRI includes a local node descriptors field and a flow-spec descriptors field. The local node descriptors field includes the first network device identifier of the first network device. The flow-spec descriptors field includes the first ACL information of the first network device.

The structure of the first BGP-LS packet is the same as a structure of the first BGP-LS packet shown in FIG. 7 in the method for collecting an ACL provided in FIG. 4. For details, refer to description of the first BGP-LS packet shown in FIG. 7. Details are not described herein again.

Optionally, the method further includes parsing, by the controller, the extended first BGP-LS packet to obtain second ACL information of the second network device.

It should be noted herein that the extended first BGP-LS packet may further carry ACL information of any one or more network devices that belong to the same IGP area as the second network device. That is, the controller may obtain the ACL information of the any one or more network devices in the IGP area from the extended first BGP-LS packet sent by the second network device. Generally, the controller may obtain ACL information of all network devices in the IGP area from the extended first BGP-LS packet sent by the second network device. The controller may learn of the ACL information of all the network devices, and manage the ACL information.

Optionally, the method further includes sending, by the controller, an extended second BGP-LS packet to the second network device, where the extended second BGP-LS packet includes a device identifier of a first target network device and first ACL editing information, and the first ACL editing information is used to edit ACL information of the first target network device.

In a specific embodiment, the extended second BGP-LS packet includes a local node descriptors field and an opaque node attribute TLV field. The local node descriptors field includes the identifier of the first target network device. The opaque node attribute TLV includes the first ACL editing information for the first target network device.

The opaque node attribute TLV field includes a type, a length, and a value. The type indicates that a type of the opaque node attribute TLV field is "announce ACL editing information". The length indicates a length of the opaque node attribute TLV field. The value is opaque node attributes including a third LSA packet. The third LSA packet carries the first ACL editing information for the first target network device.

Optionally, the third LSA packet includes an opaque type field, an advertising network device identifier field, and a TLV field. The opaque type field carries a type value indicating that the third LSA packet is used to announce ACL editing information used to edit ACL information of a target network device. The advertising network device identifier field carries the identifier of the first target network device. The TLV field carries the first ACL editing information for the first target network device.

The TLV field includes a type, a length, and a value. The type indicates that a type of the TLV field is "carry ACL editing information". The length indicates a length of the TLV field. The value is the first ACL editing information for the first target network device.

The third LSA packet is an extended OSPF opaque LSA packet or an extended intermediate ISIS opaque LSA packet.

In another specific embodiment, the extended second BGP-LS packet is flow-spec NLRI. The flow-spec NLRI includes a local node descriptors field and a flow-spec descriptors field. The local node descriptors field includes the identifier of the target network device. The flow-spec descriptors field includes the first ACL editing information for the target network device.

When a skilled person finds that ACL information of a network device in the IGP area cannot meet an actual application requirement, the skilled person configures, on the controller, first ACL editing information used to edit the ACL information of the network device. After receiving the first ACL editing information, the network device edits the ACL information of the network device using the first ACL editing information.

For example, when the first ACL information of the first network device cannot meet an actual requirement, the skilled person configures the first ACL editing information on the controller. The controller sends the extended second BGP-LS packet to the second network device. The extended second BGP-LS packet includes the first ACL editing information. After receiving the extended second BGP-LS packet, the second network device floods the first ACL editing information into the IGP area using the third LSA packet. After receiving the third LSA packet, the first network device performs parsing to obtain the first ACL editing information, and edits the first ACL information of the first network device using the first ACL editing information.

Optionally, the second BGP-LS packet further includes second ACL editing information. The second ACL editing information is used to edit ACL information of the second network device.

It should be noted herein that the extended second BGP-LS packet sent by the controller to the second network device may not only carry the first ACL editing information used to edit the first ACL information of the first network device, but may also carry ACL editing information used to edit ACL information of any one or more network devices in the IGP area. For example, the extended second BGP-LS packet may further carry the second ACL editing information used to edit the second ACL information of the second network device. Certainly, the extended second BGP-LS packet may further carry ACL editing information for another network device in the IGP area. Details are not described herein.

Optionally, the method further includes sending, by the controller, an ACL configuration packet to a target network device using a control channel, where the ACL configuration packet carries third ACL editing information, and the third ACL editing information is used to edit first ACL information of the target network device.

Alternatively, the controller may directly send, using the control channel instead of a network device that establishes a BGP-LS connection to the controller, ACL editing information to a network device whose ACL information does not meet an actual requirement.

In other approaches, there are multiple border routers in a large network area, and ACL information needs to be configured on each border router, to control network traffic. When the ACL information is dynamically configured, a border router as a Border Gateway Protocol (BGP) peer sends sampled traffic to a traffic analysis server. The traffic analysis server identifies abnormal attack traffic, creates a BGP flow specification route according to the abnormal attack traffic, and sends the BGP flow specification route to the border router. The border router sends the BGP flow specification route to another border router that performs a BGP session with the border router. After receiving the BGP flow specification route, each border router converts the BGP flow specification route into ACL information of a data forwarding layer. After using the ACL information on a port, the border router forbids the abnormal attack traffic to pass.

The foregoing method for dynamically configuring an ACL can be used only to passively configure, on a border router, an ACL that prevents abnormal attack traffic. ACL information that prevents non-abnormal attack traffic can be only manually and statically configured one by one on border routers.

According to the method for collecting an ACL provided in the present disclosure, network devices in a same IGP management area flood, into the IGP area, LSA packets that carry ACL information, and the network devices in the IGP area may learn of ACL information of another network device. A network device that establishes a BGP-LS communication connection to a controller sends a first BGP-LS packet to the controller. The first BGP-LS packet carries ACL information of any one or more network devices in the IGP area. The controller manages the learned ACL information of the network device, and manages the ACL information of the network device. In addition, the controller may send ACL editing information, and the ACL editing information is used to edit ACL information that is of at least one or more network devices and that does not meet an actual requirement. In this way, the ACL information of the network device is actively edited, and ACL information maintenance work is simplified.

Figure 10:
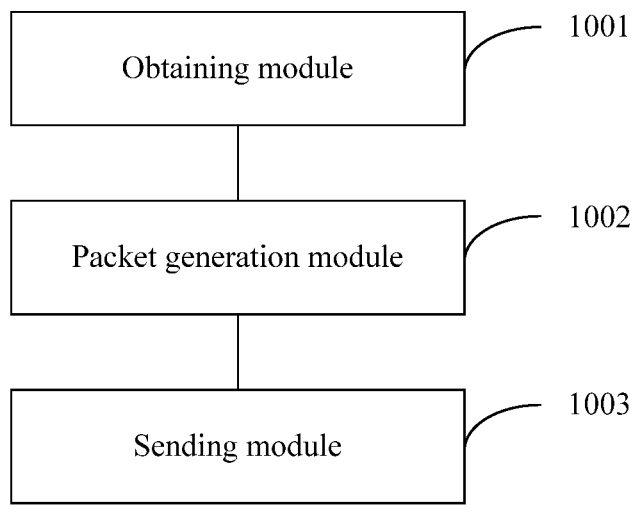
FIG. 10 is a schematic structural diagram of a first network device for collecting an ACL according to an embodiment of the present disclosure.

FIG. 10 is a schematic structural diagram of a first network device for collecting an ACL according to an embodiment of the present disclosure. The first network device shown in FIG. 10 is a network device corresponding to the method for collecting an ACL shown in FIG. 2. The first network device includes an obtaining module 1001 configured to obtain first ACL information of the first network device, a packet generation module 1002 configured to generate a first LSA packet, where the first LSA packet includes a first network device identifier and the first ACL information correlated to the first network device identifier, and the first network device identifier is used to identify the first network device, and a sending module 1003 configured to flood the first LSA packet into an IGP area to which the first network device belongs, where the first LSA packet is used to announce the first ACL information of the first network device to another network device in the IGP area.

Optionally, the first LSA packet includes an opaque type field, an advertising network device identifier field, and a TLV field. The opaque type field carries a type value indicating that the first LSA packet is used to announce ACL information of a network device. The advertising network device identifier field carries the first network device identifier. The TLV field carries the first ACL information of the first network device.

The TLV field includes a type, a length, and a value. The type indicates that a type of the TLV field is "carry ACL information". The length indicates a length of the TLV field. The value is the first ACL information of the first network device.

The first LSA packet is an extended OSPF opaque LSA packet or an extended intermediate ISIS opaque LSA packet.

Optionally, the first network device further includes a first receiving module configured to receive a second LSA packet flooded by a second network device that belongs to the IGP area, where the second LSA packet includes a second network device identifier and second ACL information correlated to the second network device identifier, the second network device identifier is used to identify the second network device, and the second LSA packet is used to announce the second ACL information of the second network device to another network device in the IGP area.

Optionally, the second LSA packet includes an opaque type field, an advertising network device identifier field, and a TLV field. The opaque type field carries a type value indicating that the second LSA packet is used to announce ACL information of a network device. The advertising network device identifier field carries the second network device identifier. The TLV field carries the second ACL information of the second network device.

The TLV field includes a type, a length, and a value. The type indicates that a type of the TLV field is "carry ACL information". The length indicates a length of the TLV field. The value is the second ACL information of the second network device.

The second LSA packet is an extended OSPF opaque LSA packet or an extended intermediate ISIS opaque LSA packet.

Optionally, the first network device further includes a second receiving module configured to receive a third LSA packet flooded by the second network device that belongs to the IGP area, where the third LSA packet carries an identifier of a target network device and first ACL editing information correlated to the identifier of the target network device, and the first ACL editing information is used to edit ACL information of the target network device, a first parsing module configured to, when the first network device determines, according to the identifier of the target network device, that the target network device of the third LSA packet is the first network device, parse the third LSA packet to obtain the first ACL editing information, and a first editing module configured to edit the first ACL information of the first network device according to the first ACL editing information.

Optionally, the third LSA packet includes an opaque type field, an advertising network device identifier field, and a TLV field. The opaque type field carries a type value indicating that the third LSA packet is used to announce ACL editing information used to edit ACL information of a target network device. The advertising network device identifier field carries the identifier of the target network device. The TLV field carries the first ACL editing information for the target network device.

The TLV field includes a type, a length, and a value. The type indicates that a type of the TLV field is "carry ACL editing information". The length indicates a length of the TLV field. The value is the first ACL editing information for the target network device.

The third LSA packet is an extended OSPF opaque LSA packet or an extended intermediate ISIS opaque LSA packet.

Optionally, the first network device further includes a third receiving module configured to receive an ACL configuration packet delivered by a controller using a control channel, a second parsing module configured to parse the ACL configuration packet to obtain second ACL editing information, and a second editing module configured to edit the first ACL information of the first network device according to the second ACL editing information.

The first network device shown in FIG. 10 is a network device corresponding to the method for collecting an ACL shown in FIG. 2. For details, refer to description of the method shown in FIG. 2. Details are not described herein again.

Figure 11:
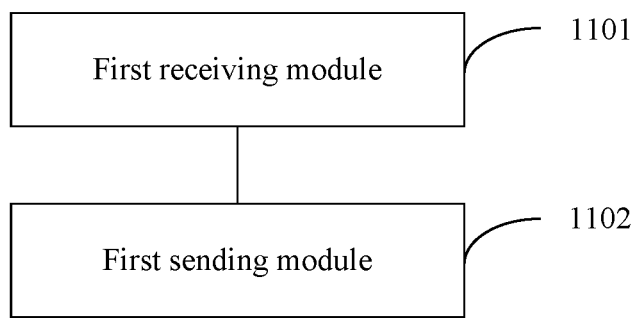
FIG. 11 is a schematic structural diagram of a second network device for collecting an ACL according to an embodiment of the present disclosure.

FIG. 11 is a schematic structural diagram of a second network device for collecting an ACL according to an embodiment of the present disclosure. The second network device shown in FIG. 11 is a network device corresponding to the flowchart of the method for collecting an ACL shown in FIG. 4. The second network device includes a first receiving module 1101 configured to receive a first LSA packet flooded by a first network device, where the first LSA packet includes a first network device identifier and first ACL information correlated to the first network device identifier, the first network device identifier is used to identify the first network device, and the first network device and the second network device belong to a same IGP area, and a first sending module 1102 configured to send an extended first BGP-LS packet to the controller, where the extended first BGP-LS packet includes the first network device identifier and the first ACL information.

Optionally, the extended first BGP-LS packet includes a local node descriptors local node descriptors field and an opaque node attribute type-length-value opaque node attribute TLV field. The local node descriptors field includes the first network device identifier. The opaque node attribute TLV field includes the first LSA packet of the first network device.

The opaque node attribute TLV field includes a type, a length, and a value. The type indicates that a type of the opaque node attribute TLV field is "report ACL information". The length indicates a length of the opaque node attribute TLV field. The value is opaque node attributes including the first LSA packet. The first LSA packet includes the first ACL information of the first network device.

Optionally, the extended first BGP-LS packet is newly added flow-spec NLRI. The flow-spec NLRI includes a local node descriptors field and a flow-spec descriptors field. The local node descriptors field includes the first network device identifier. The flow-spec descriptors field includes the first ACL information of the first network device.

Optionally, the first LSA packet includes an opaque type field, an advertising network device identifier field, and a TLV field. The opaque type field carries a type value indicating that the first LSA packet is used to announce ACL information of a network device. The advertising network device identifier field carries the first network device identifier. The TLV field carries the first ACL information of the first network device.

The TLV field includes a type, a length, and a value. The type indicates that a type of the TLV field is "carry ACL information". The length indicates a length of the TLV field. The value is the first ACL information.

The first LSA packet is an extended OSPF opaque LSA packet or an extended intermediate ISIS opaque LSA packet.

Optionally, the second network device further includes an obtaining module configured to obtain second ACL information and a second network device identifier of the second network device.

Correspondingly, the extended first BGP-LS packet further includes the second network device identifier and the second ACL information.

Optionally, the second network device further includes a packet generation module configured to generate a second LSA packet, where the second LSA packet includes the second network device identifier and the second ACL information correlated to the second network device identifier, and the second network device identifier is used to identify the second network device, and a second sending module configured to flood the second LSA packet into the IGP area to which the second network device belongs, where the second LSA packet is used to announce the second ACL information of the second network device to another network device in the IGP area.

Optionally, the second LSA packet includes an opaque type field, an advertising network device identifier field, and a TLV field. The opaque type field carries a type value indicating that the second LSA packet is used to announce ACL information of a network device. The advertising network device identifier field carries the second network device identifier. The TLV field carries the second ACL information of the second network device.

The TLV field includes a type, a length, and a value. The type indicates that a type of the TLV field is "carry ACL information". The length indicates a length of the TLV field. The value is the second ACL information of the second network device.

The second LSA packet is an extended OSPF opaque LSA packet or an extended intermediate ISIS opaque LSA packet.

Optionally, the second network device further includes a second receiving module configured to receive an extended second BGP-LS packet sent by the controller, where the extended second BGP-LS packet carries an identifier of a target network device and first ACL editing information, and the first ACL editing information is used to edit ACL information of the target network device, and a third sending module configured to, when the second network device determines, according to the identifier of the target network device, that the target network device is not the second network device, flood a third LSA packet to the target network device in the IGP area, where the third LSA packet is used to announce the first ACL editing information for the target network device to the target network device in the IGP area.

Optionally, the extended second BGP-LS packet includes a local node descriptors field and an opaque node attribute TLV field. The local node descriptors field includes the identifier of the target network device. The opaque node attribute TLV includes the first ACL editing information for the target network device.

The opaque node attribute TLV field includes a type, a length, and a value. The type indicates that a type of the opaque node attribute TLV field is "announce ACL editing information". The length indicates a length of the opaque node attribute TLV field. The value is opaque node attributes including a third LSA packet. The third LSA packet carries the first ACL editing information for the target network device.

Optionally, the extended second BGP-LS packet includes flow-spec NLRI. The flow-spec NLRI includes a local node descriptors field and a flow-spec descriptors field. The local node descriptors field includes the identifier of the target network device. The flow-spec descriptors field includes the first ACL editing information for the target network device.

Optionally, the third LSA packet includes an opaque type field, an advertising network device identifier field, and a TLV field. The opaque type field carries a type value indicating that the third LSA packet is used to announce ACL editing information used to edit ACL information of a target network device. The advertising network device identifier field carries the identifier of the target network device. The TLV field carries the first ACL editing information for the target network device.

The TLV field includes a type, a length, and a value. The type indicates that a type of the TLV field is "carry ACL editing information". The length indicates a length of the TLV field. The value is the first ACL editing information for the target network device.

The third LSA packet is an extended OSPF opaque LSA packet or an extended intermediate ISIS opaque LSA packet.

The second network device shown in FIG. 11 is a network device corresponding to the method for collecting an ACL shown in FIG. 4. For details, refer to description of the method shown in FIG. 4. Details are not described herein again.

Figure 12:
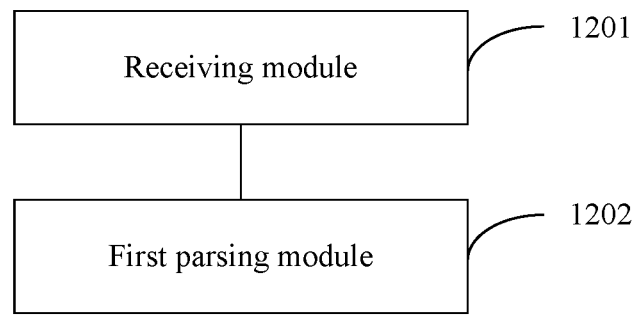
FIG. 12 is a schematic structural diagram of a controller for collecting an ACL according to an embodiment of the present disclosure.

FIG. 12 is a schematic structural diagram of a controller for collecting an ACL according to an embodiment of the present disclosure. The controller shown in FIG. 12 is a controller corresponding to the method for collecting an ACL shown in FIG. 9. The controller includes a receiving module 1201 configured to receive an extended first BGP-LS packet sent by a second network device, and a first parsing module 1202 configured to parse the extended first BGP-LS packet to obtain a first network device identifier and first ACL information of a first network device, where the first network device and the second network device belong to a same IGP area.

Optionally, the extended first BGP-LS packet includes a local node descriptors local node descriptors field and an opaque node attribute type-length-value opaque node attribute TLV field. The local node descriptors field includes the first network device identifier. The opaque node attribute TLV includes the first ACL information of the first network device.

The opaque node attribute TLV field includes a type, a length, and a value. The type indicates that a type of the opaque node attribute TLV field is "report ACL information". The length indicates a length of the opaque node attribute TLV field. The value is opaque node attributes including a first LSA packet. The first LSA packet carries the first ACL information of the first network device.

Optionally, the first LSA packet includes an opaque type field, an advertising network device identifier field, and a TLV field. The opaque type field carries a type value indicating that the first LSA packet is used to announce ACL information of a network device. The advertising network device identifier field carries the first network device identifier. The TLV field carries the first ACL information of the first network device.

The TLV field includes a type, a length, and a value. The type indicates that a type of the TLV field is "carry ACL information". The length indicates a length of the TLV field. The value is the first ACL information of the first network device.

The first LSA packet is an extended OSPF opaque LSA packet or an extended intermediate ISIS opaque LSA packet.

Optionally, the extended first BGP-LS packet is flow-spec NLRI. The flow-spec NLRI includes a local node descriptors field and a flow-spec descriptors field. The local node descriptors field includes the first network device identifier. The flow-spec descriptors field includes the first ACL information of the first network device.

Optionally, the controller further includes a second parsing module configured to parse the extended first BGP-LS packet to obtain a second network device identifier and second ACL information of the second network device.

Optionally, the controller further includes a first sending module configured to send an extended second BGP-LS packet to the second network device, where the extended second BGP-LS packet includes a device identifier of a first target network device and first ACL editing information, and the first ACL editing information is used to edit ACL information of the first target network device.

Optionally, the extended second BGP-LS packet includes a local node descriptors field and an opaque node attribute TLV field. The local node descriptors field includes the identifier of the first target network device. The opaque node attribute TLV includes the first ACL editing information for the first target network device.

The opaque node attribute TLV field includes a type, a length, and a value. The type indicates that a type of the opaque node attribute TLV field is "announce ACL editing information". The length indicates a length of the opaque node attribute TLV field. The value is opaque node attributes including a third LSA packet. The third LSA packet carries the first ACL editing information for the first target network device.

Optionally, the third LSA packet includes an opaque type field, an advertising network device identifier field, and a TLV field. The opaque type field carries a type value indicating that the third LSA packet is used to announce ACL editing information used to edit ACL information of a target network device. The advertising network device identifier field carries the identifier of the first target network device. The TLV field carries the first ACL editing information for the first target network device.

The TLV field includes a type, a length, and a value. The type indicates that a type of the TLV field is "carry ACL editing information". The length indicates a length of the TLV field. The value is the first ACL editing information for the first target network device.

The third LSA packet is an extended OSPF opaque LSA packet or an extended intermediate ISIS opaque LSA packet.

Optionally, the extended second BGP-LS packet is flow-spec NLRI. The flow-spec NLRI includes a local node descriptors field and a flow-spec descriptors field. The local node descriptors field includes the identifier of the target network device. The flow-spec descriptors field includes the first ACL editing information for the target network device.

Optionally, the second BGP-LS packet further includes second ACL editing information. The second ACL editing information is used to edit second ACL information of the second target network device.

Optionally, the controller further includes a second sending module configured to send an ACL configuration packet to a target network device using a control channel, where the ACL configuration packet carries third ACL editing information, and the third ACL editing information is used to edit first ACL information of the target network device.

The controller shown in FIG. 12 is a controller corresponding to the method for collecting an ACL shown in FIG. 9. For details, refer to description of the method shown in FIG. 9. Details are not described herein again.

Figure 13:
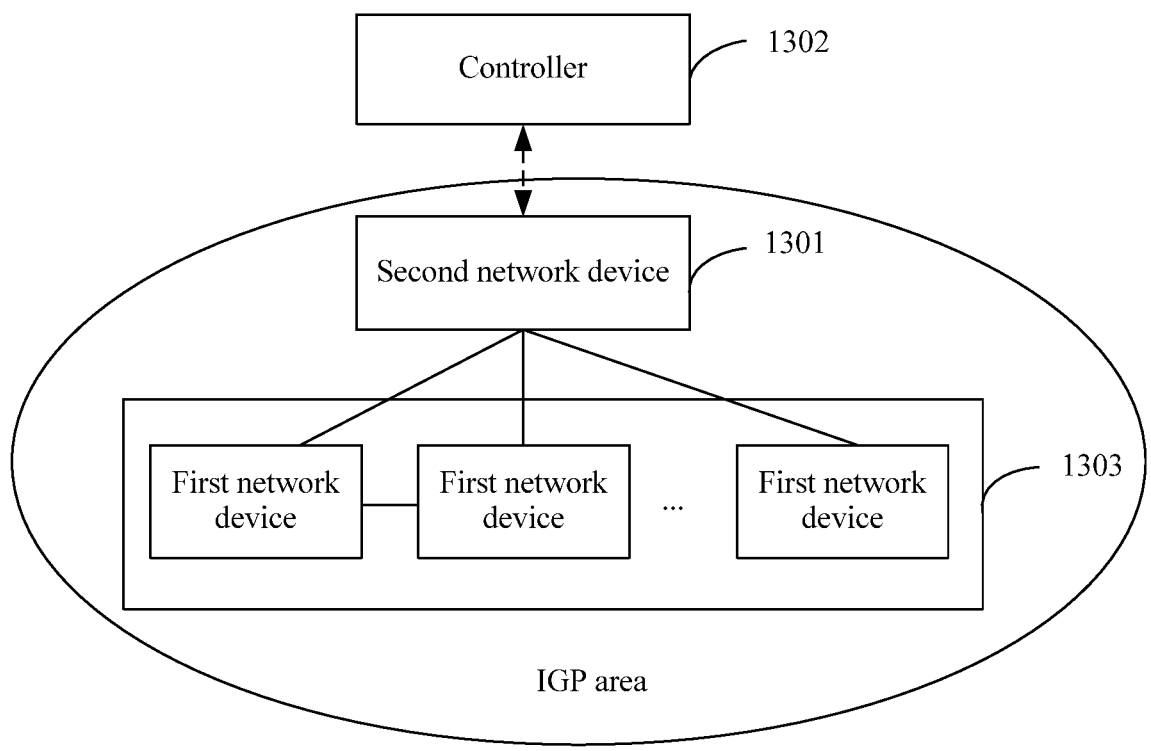
FIG. 13 is a schematic structural diagram of a system for collecting an ACL according to an embodiment of the present disclosure.

FIG. 13 is a schematic structural diagram of a system for collecting an access list according to an embodiment of the present disclosure. The system includes the second network device 1301 in FIG. 11, the controller 1302 in FIG. 12, and at least one first network device 1303 in FIG. 10.

The second network device 1301 is connected to the controller 1302. The at least one first network device 1303 is connected to the second network device 1301.

Figure 14:
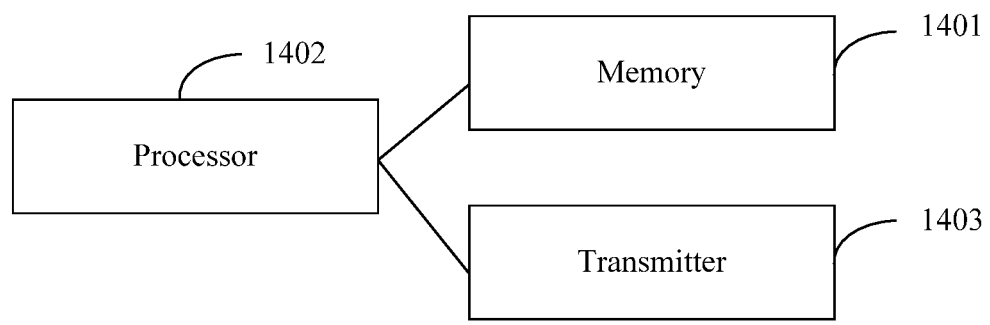
FIG. 14 is a schematic structural diagram of hardware of a first network device for collecting an ACL according to an embodiment of the present disclosure.

FIG. 14 is a schematic structural diagram of hardware of a first network device for collecting an ACL according to an embodiment of the present disclosure. The first network device includes a memory 1401, a processor 1402, and a transmitter 1403. Each of the memory 1401 and the transmitter 1403 is connected to the processor 1402. The memory 1401 is configured to store program code.

The processor 1402 is configured to, after reading the program code stored in the memory 1401, execute the following content obtaining first ACL information of the first network device, and generating a first LSA packet, where the first LSA packet includes a first network device identifier and the first ACL information correlated to the first network device identifier, and the first network device identifier is used to identify the first network device.

The transmitter 1403 is configured to flood the first LSA packet into an IGP area to which the first network device belongs. The first LSA packet is used to announce the first ACL information of the first network device to another network device in the IGP area.

Optionally, the first LSA packet includes an opaque type field, an advertising network device identifier field, and a TLV field. The opaque type field carries a type value indicating that the first LSA packet is used to announce ACL information of a network device. The advertising network device identifier field carries the first network device identifier. The TLV field carries the first ACL information of the first network device.

The TLV field includes a type, a length, and a value. The type indicates that a type of the TLV field is "carry ACL information". The length indicates a length of the TLV field. The value is the first ACL information of the first network device.

The first LSA packet is an extended OSPF opaque LSA packet or an extended intermediate ISIS opaque LSA packet.

Optionally, the first network device further includes a receiver configured to receive a second LSA packet flooded by a second network device that belongs to the IGP area, where the second LSA packet includes a second network device identifier and second ACL information correlated to the second network device identifier, the second network device identifier is used to identify the second network device, and the second LSA packet is used to announce the second ACL information of the second network device to another network device in the IGP area.

Optionally, the second LSA packet includes an opaque type field, an advertising network device identifier field, and a TLV field. The opaque type field carries a type value indicating that the second LSA packet is used to announce ACL information of a network device. The advertising network device identifier field carries the second network device identifier. The TLV field carries the second ACL information of the second network device.

The TLV field includes a type, a length, and a value. The type indicates that a type of the TLV field is "carry ACL information". The length indicates a length of the TLV field. The value is the second ACL information of the second network device.

The second LSA packet is an extended OSPF opaque LSA packet or an extended intermediate ISIS opaque LSA packet.

Optionally, the receiver is further configured to receive a third LSA packet flooded by the second network device that belongs to the IGP area. The third LSA packet carries an identifier of a target network device and first ACL editing information correlated to the identifier of the target network device. The first ACL editing information is used to edit ACL information of the target network device.

The processor 1402 is further configured to, when the first network device determines, according to the identifier of the target network device, that the target network device of the third LSA packet is the first network device, parse the third LSA packet to obtain the first ACL editing information, and edit the first ACL information of the first network device according to the first ACL editing information.

Optionally, the third LSA packet includes an opaque type field, an advertising network device identifier field, and a TLV field. The opaque type field carries a type value indicating that the third LSA packet is used to announce ACL editing information used to edit ACL information of a target network device. The advertising network device identifier field carries the identifier of the target network device. The TLV field carries the first ACL editing information for the target network device.

The TLV field includes a type, a length, and a value. The type indicates that a type of the TLV field is "carry ACL editing information". The length indicates a length of the TLV field. The value is the first ACL editing information for the target network device.

The third LSA packet is an extended OSPF opaque LSA packet or an extended intermediate ISIS opaque LSA packet.

Optionally, the receiver is further configured to receive an ACL configuration packet delivered by a controller using a control channel.

The processor 1402 is further configured to parse the ACL configuration packet to obtain second ACL editing information, and edit the first ACL information of the first network device according to the second ACL editing information.

The first network device shown in FIG. 14 is a network device corresponding to the method for collecting an ACL shown in FIG. 2. For details, refer to description of the method shown in FIG. 2. Details are not described herein again.

Figure 15:
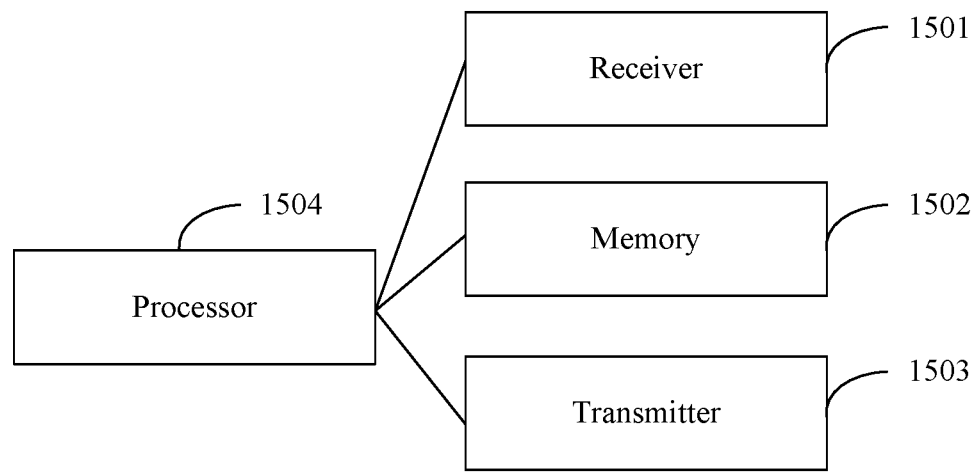
FIG. 15 is a schematic structural diagram of hardware of a second network device for collecting an ACL according to an embodiment of the present disclosure.

FIG. 15 is a schematic structural diagram of hardware of a second network device for collecting an ACL according to an embodiment of the present disclosure. The second network device includes a receiver 1501, a memory 1502, a transmitter 1503, and a processor 1504 that is connected to each of the receiver 1501, the memory 1502, and the transmitter 1503.

The receiver 1501 is configured to receive a first LSA packet flooded by a first network device. The first LSA packet includes a first network device identifier and first ACL information correlated to the first network device identifier. The first network device identifier is used to identify the first network device. The first network device and the second network device belong to a same IGP area.

The memory 1502 is configured to store program code.

The processor 1504 is configured to, after reading the program code stored in the memory 1502, generate an extended first BGP-LS packet according to the first network device identifier and the first ACL information in the first LSA packet.

The transmitter 1503 is configured to send the extended first BGP-LS packet to the controller. The extended first BGP-LS packet includes the first network device identifier and the first ACL information.

Optionally, the extended first BGP-LS packet includes a local node descriptors local node descriptors field and an opaque node attribute type-length-value opaque node attribute TLV field. The local node descriptors field includes the first network device identifier. The opaque node attribute TLV field includes the first LSA packet of the first network device.

The opaque node attribute TLV field includes a type, a length, and a value. The type indicates that a type of the opaque node attribute TLV field is "report ACL information". The length indicates a length of the opaque node attribute TLV field. The value is opaque node attributes including the first LSA packet. The first LSA packet includes the first ACL information of the first network device.

Optionally, the extended first BGP-LS packet is newly added flow-spec NLRI. The flow-spec NLRI includes a local node descriptors field and a flow-spec descriptors field. The local node descriptors field includes the first network device identifier. The flow-spec descriptors field includes the first ACL information of the first network device.

Optionally, the first LSA packet includes an opaque type field, an advertising network device identifier field, and a TLV field. The opaque type field carries a type value indicating that the first LSA packet is used to announce ACL information of a network device. The advertising network device identifier field carries the first network device identifier. The TLV field carries the first ACL information of the first network device.

The TLV field includes a type, a length, and a value. The type indicates that a type of the TLV field is "carry ACL information". The length indicates a length of the TLV field. The value is the first ACL information.

The first LSA packet is an extended OSPF opaque LSA packet or an extended intermediate ISIS opaque LSA packet.

Optionally, the processor 1504 is further configured to obtain second ACL information and a second network device identifier of the second network device.

Correspondingly, the extended first BGP-LS packet further includes the second network device identifier and the second ACL information.

Optionally, the processor 1504 is further configured to generate a second LSA packet. The second LSA packet includes the second network device identifier and the second ACL information correlated to the second network device identifier. The second network device identifier is used to identify the second network device.

The transmitter 1503 is further configured to flood the second LSA packet into the IGP area to which the second network device belongs. The second LSA packet is used to announce the second ACL information of the second network device to another network device in the IGP area.

Optionally, the second LSA packet includes an opaque type field, an advertising network device identifier field, and a TLV field. The opaque type field carries a type value indicating that the second LSA packet is used to announce ACL information of a network device. The advertising network device identifier field carries the second network device identifier. The TLV field carries the second ACL information of the second network device.

The TLV field includes a type, a length, and a value. The type indicates that a type of the TLV field is "carry ACL information". The length indicates a length of the TLV field. The value is the second ACL information of the second network device.

The second LSA packet is an extended OSPF opaque LSA packet or an extended intermediate ISIS opaque LSA packet.

Optionally, the receiver 1501 is further configured to receive an extended second BGP-LS packet sent by the controller. The extended second BGP-LS packet carries an identifier of a target network device and first ACL editing information. The first ACL editing information is used to edit ACL information of the target network device.

The transmitter 1503 is further configured to, when the second network device determines, according to the identifier of the target network device, that the target network device is not the second network device, flood a third LSA packet to the target network device in the IGP area. The third LSA packet is used to announce the first ACL editing information for the target network device to the target network device in the IGP area.

Optionally, the extended second BGP-LS packet includes a local node descriptors field and an opaque node attribute TLV field. The local node descriptors field includes the identifier of the target network device. The opaque node attribute TLV includes the first ACL editing information for the target network device.

The opaque node attribute TLV field includes a type, a length, and a value. The type indicates that a type of the opaque node attribute TLV field is "announce ACL editing information". The length indicates a length of the opaque node attribute TLV field. The value is opaque node attributes including a third LSA packet. The third LSA packet carries the first ACL editing information for the target network device.

Optionally, the extended second BGP-LS packet includes flow-spec NLRI. The flow-spec NLRI includes a local node descriptors field and a flow-spec descriptors field. The local node descriptors field includes the identifier of the target network device. The flow-spec descriptors field includes the first ACL editing information for the target network device.

Optionally, the third LSA packet includes an opaque type field, an advertising network device identifier field, and a TLV field. The opaque type field carries a type value indicating that the third LSA packet is used to announce ACL editing information used to edit ACL information of a target network device. The advertising network device identifier field carries the identifier of the target network device. The TLV field carries the first ACL editing information for the target network device.

The TLV field includes a type, a length, and a value. The type indicates that a type of the TLV field is "carry ACL editing information". The length indicates a length of the TLV field. The value is the first ACL editing information for the target network device.

The third LSA packet is an extended OSPF opaque LSA packet or an extended intermediate ISIS opaque LSA packet.

The second network device shown in FIG. 15 is a network device corresponding to the method for collecting an ACL shown in FIG. 4. For details, refer to description of the method shown in FIG. 4. Details are not described herein again.

Figure 16:
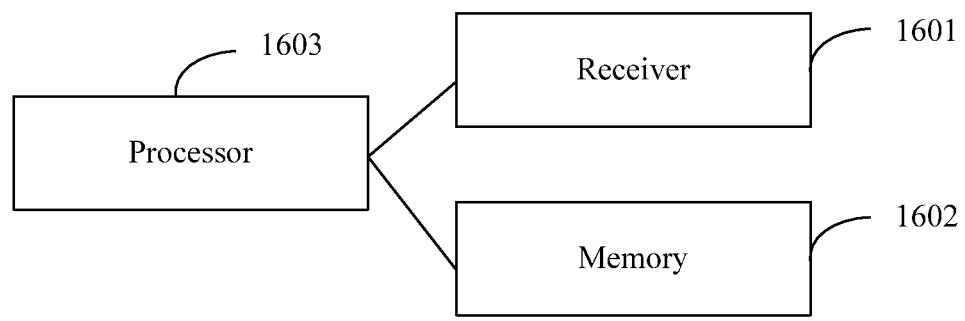
FIG. 16 is a schematic structural diagram of hardware of a controller for collecting an ACL according to an embodiment of the present disclosure.

FIG. 16 is a schematic structural diagram of hardware of a controller for collecting an ACL according to an embodiment of the present disclosure. The controller includes a receiver 1601, a memory 1602, and a processor 1603 that is connected to each of the receiver 1601 and the memory 1602.

The receiver 1601 is configured to receive an extended first BGP-LS packet sent by a second network device.

The memory 1602 is configured to store program code. The processor 1603 is configured to invoke the stored program code from the memory 1602 to execute the following content parsing the extended first BGP-LS packet to obtain a first network device identifier and first ACL information of a first network device, where the first network device and the second network device belong to a same IGP area.

Optionally, the extended first BGP-LS packet includes a local node descriptors local node descriptors field and an opaque node attribute type-length-value opaque node attribute TLV field. The local node descriptors field includes the first network device identifier. The opaque node attribute TLV includes the first ACL information of the first network device.

The opaque node attribute TLV field includes a type, a length, and a value. The type indicates that a type of the opaque node attribute TLV field is "report ACL information". The length indicates a length of the opaque node attribute TLV field. The value is opaque node attributes including a first LSA packet. The first LSA packet carries the first ACL information of the first network device.

Optionally, the first LSA packet includes an opaque type field, an advertising network device identifier field, and a TLV field. The opaque type field carries a type value indicating that the first LSA packet is used to announce ACL information of a network device. The advertising network device identifier field carries the first network device identifier. The TLV field carries the first ACL information of the first network device.

The TLV field includes a type, a length, and a value. The type indicates that a type of the TLV field is "carry ACL information". The length indicates a length of the TLV field. The value is the first ACL information of the first network device.

The first LSA packet is an extended OSPF opaque LSA packet or an extended intermediate ISIS opaque LSA packet.

Optionally, the extended first BGP-LS packet is flow-spec NLRI. The flow-spec NLRI includes a local node descriptors field and a flow-spec descriptors field. The local node descriptors field includes the first network device identifier. The flow-spec descriptors field includes the first ACL information of the first network device.

Optionally, the processor 1603 is further configured to parse the extended first BGP-LS packet to obtain a second network device identifier and second ACL information of the second network device.

Optionally, the controller further includes a transmitter configured to send an extended second BGP-LS packet to the second network device, where the extended second BGP-LS packet includes a device identifier of a first target network device and first ACL editing information, and the first ACL editing information is used to edit ACL information of the first target network device.

Optionally, the extended second BGP-LS packet includes a local node descriptors field and an opaque node attribute TLV field. The local node descriptors field includes the identifier of the first target network device. The opaque node attribute TLV includes the first ACL editing information for the first target network device.

The opaque node attribute TLV field includes a type, a length, and a value. The type indicates that a type of the opaque node attribute TLV field is "announce ACL editing information". The length indicates a length of the opaque node attribute TLV field. The value is opaque node attributes including a third LSA packet. The third LSA packet carries the first ACL editing information for the first target network device.

Optionally, the third LSA packet includes an opaque type field, an advertising network device identifier field, and a TLV field. The opaque type field carries a type value indicating that the third LSA packet is used to announce ACL editing information used to edit ACL information of a target network device. The advertising network device identifier field carries the identifier of the first target network device. The TLV field carries the first ACL editing information for the first target network device.

The TLV field includes a type, a length, and a value. The type indicates that a type of the TLV field is "carry ACL editing information". The length indicates a length of the TLV field. The value is the first ACL editing information for the first target network device.

The third LSA packet is an extended OSPF opaque LSA packet or an extended intermediate ISIS opaque LSA packet.

Optionally, the extended second BGP-LS packet is flow-spec NLRI. The flow-spec NLRI includes a local node descriptors field and a flow-spec descriptors field. The local node descriptors field includes the identifier of the target network device. The flow-spec descriptors field includes the first ACL editing information for the target network device.

Optionally, the second BGP-LS packet further includes second ACL editing information. The second ACL editing information is used to edit second ACL information of the second target network device.

Optionally, the transmitter is further configured to send an ACL configuration packet to a target network device using a control channel. The ACL configuration packet carries third ACL editing information. The third ACL editing information is used to edit first ACL information of the target network device.

The controller shown in FIG. 16 is a controller corresponding to the method for collecting an ACL shown in FIG. 9. For details, refer to description of the method shown in FIG. 9. Details are not described herein again.

Figure 17:
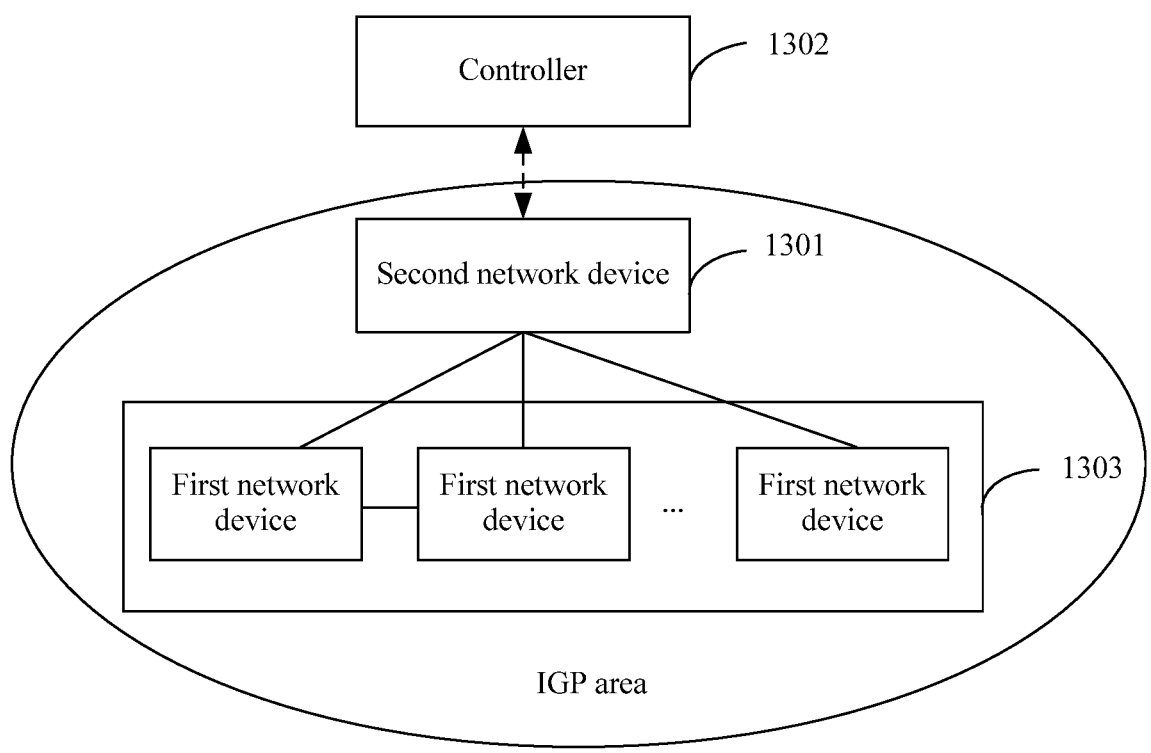
FIG. 17 is a schematic structural diagram of hardware of a system for collecting an access list according to an embodiment of the present disclosure.

FIG. 17 is a schematic structural diagram of hardware of a system for collecting an access list according to an embodiment of the present disclosure. The system includes the second network device 1701 in FIG. 15, the controller 1702 in FIG. 16, and at least one first network device 1703 in FIG. 14.

The second network device 1701 is connected to the controller 1702. The at least one first network device 1703 is connected to the second network device 1701.

The foregoing descriptions are merely implementations of the present disclosure. It should be noted that a person of ordinary skill in the art may make several improvements or polishing without departing from the principle of the present disclosure and the improvements or polishing shall fall within the protection scope of the present disclosure.

What is claimed is:

1. An access control list (ACL) collection method, implemented by a first network device, wherein the ACL collection method comprises:
obtaining first ACL information of the first network device;
generating a first link-state advertisement (LSA) packet, wherein the LSA packet is an open shortest path first (OSPF) packet or an intermediate system to intermediate system (IS-IS) packet, and wherein the first LSA packet comprises the first ACL information of the first network device;
sending the first LSA packet to another network device;
receiving a third LSA packet, wherein the third LSA packet carries first ACL editing information; and
editing the first ACL information of the first network device according to the first ACL editing information.

2. The ACL collection method of claim 1, further comprising receiving a second LSA packet from a second network device, wherein the second LSA packet comprises second ACL information of the second network device.

3. An access control list (ACL) collection method, implemented by a controller, wherein the ACL collection method comprises:
receiving a first link-state advertisement (LSA) packet from a first network device, wherein the LSA packet is an open shortest path first (OSPF) packet or an intermediate system to intermediate system (IS-IS) packet;
parsing the first LSA packet to obtain first ACL information of the first network device; and
sending a second LSA packet to the first network device, wherein the second LSA packet comprises first ACL editing information, and wherein the first ACL editing information is used to edit ACL information of the first network device.

4. The ACL collection method of claim 3, wherein the second LSA packet further comprises second ACL editing information, and wherein the second ACL editing information is used to edit second ACL information of a second target network device.

5. The ACL collection method of claim 3, wherein the second LSA packet is sent using a control channel.

6. The ACL collection method of claim 3, wherein the first LSA packet comprises an opaque node attribute type-length-value (TLV) and an opaque node attribute TLV field, and wherein the opaque node attribute TLV includes the first ACL information of the first network device.

7. The ACL collection method of claim 6, wherein the opaque node attribute TLV field comprises a type, a length, and a value, wherein the type indicates that the type of the opaque node attribute TLV field is report ACL information, wherein the length indicates the length of the opaque node attribute TLV field, and wherein the value indicates opaque node attributes including the first ACL information of the first network device.

8. A controller configured to collect an access control list (ACL), wherein the controller comprises:
a network interface;
a processor coupled to the network interface; and
a memory coupled to the network interface and the processor and storing instructions that, when executed by the processor, cause the controller to be configured to:
receive a first link-state advertisement (LSA) packet from a first network device, wherein the LSA packet is an open shortest path first (OSPF) packet or an intermediate system to intermediate system (IS-IS) packet;
send a second LSA packet to the first network device, wherein the second LSA packet comprises first ACL editing information, and wherein the first ACL editing information is used to edit ACL information of the first network device; and
parse the first LSA packet to obtain first ACL information of the first network device.

9. The controller of claim 8, wherein the second LSA packet further comprises second ACL editing information, and wherein the second ACL editing information is used to edit second ACL information of a second target network device.

10. The controller of claim 8, wherein the second LSA packet is sent using a control channel.

11. The controller of claim 8, wherein the first LSA packet includes an opaque node attribute type-length-value (TLV) and an opaque node attribute TLV field, and wherein the opaque node attribute TLV includes the first ACL information of the first network device.

12. The controller of claim 11, wherein the opaque node attribute TLV field includes a type, a length, and a value, wherein the type indicates that the type of the opaque node attribute TLV field is report ACL information, wherein the length indicates the length of the opaque node attribute TLV field, and wherein the value indicates opaque node attributes including the first ACL information of the first network device.

13. The ACL collection method of claim 1, further comprising flooding an Interior Gateway Protocol (IGP) area with the first LSA packet, wherein the first LSA packet announces the first ACL information of the first network device to the other network device in the IGP area.

14. The ACL collection method of claim 1, further comprising sending an extended first Border Gateway Protocol-Link State (BGP-LS) packet to a controller, wherein the extended first BGP-LS packet comprises the first ACL information.

15. The ACL collection method of claim 14, further comprising:
receiving, by the controller, the extended first BGP-LS packet; and
parsing, by the controller, the extended first BGP-LS packet to obtain the first ACL information, wherein the first network device and a second network device belong to a same IGP area.

16. The ACL collection method of claim 3, wherein receiving the first LSA packet from the first network device comprises receiving an extended first Border Gateway Protocol-Link State (BGP-LS) packet from a second network device.

17. The ACL collection method of claim 16, wherein parsing the first LSA packet to obtain the first ACL information of the first network device comprises parsing the extended first BGP-LS packet.

18. The controller of claim 8, wherein receiving the first LSA packet comprises receiving an extended first Border Gateway Protocol-Link State (BGP-LS) packet from a second network device.

19. The controller of claim 18, wherein parsing the first LSA packet comprises parsing the extended first BGP-LS packet from the second network device.

20. The ACL collection method of claim 1, wherein the first LSA packet comprises an opaque node attribute type-length-value (TLV) and an opaque node attribute TLV field, and wherein the opaque node attribute TLV includes the first ACL information of the first network device.

* * * * *

UNITED STATES PATENT AND TRADEMARK OFFICE
CERTIFICATE OF CORRECTION

PATENT NO. : 11,489,836 B2
APPLICATION NO. : 16/739551
DATED : November 1, 2022
INVENTOR(S) : Shunwan Zhuang et al.

It is certified that error appears in the above-identified patent and that said Letters Patent is hereby corrected as shown below:

On the Title Page

Item (30) Foreign Application Priority Data should read:
"June 3, 2015 (CN) 201510299148.4"

Signed and Sealed this
Twentieth Day of December, 2022

Katherine Kelly Vidal
*Director of the United States Patent and Trademark Office*